(12) United States Patent
Fujihira et al.

(10) Patent No.: US 8,438,215 B2
(45) Date of Patent: May 7, 2013

(54) CONTENT DELIVERY SYSTEM, CACHE SERVER, AND CACHE CONTROL SERVER

(75) Inventors: Kenji Fujihira, Yokomama (JP); Daisuke Matsubara, Tachikawa (JP); Yukiko Takeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 817 days.

(21) Appl. No.: 12/216,972

(22) Filed: Jul. 14, 2008

(65) Prior Publication Data
US 2009/0113068 A1      Apr. 30, 2009

(30) Foreign Application Priority Data

Oct. 31, 2007 (JP) ................ 2007-284142

(51) Int. Cl.
*G06F 15/16* (2006.01)
(52) U.S. Cl.
USPC ........ 709/203; 709/217; 709/219; 370/395.4; 386/295
(58) Field of Classification Search ........... 709/217–219
See application file for complete search history.

(56) References Cited

U.S. PATENT DOCUMENTS

| | | | |
|---|---|---|---|
| 6,947,356 B1 * | 9/2005 | Becker | 369/30.29 |
| 2006/0263048 A1 * | 11/2006 | Sato et al. | 386/95 |
| 2008/0008211 A1 * | 1/2008 | Zilbershtein et al. | 370/466 |

FOREIGN PATENT DOCUMENTS

| | | | |
|---|---|---|---|
| JP | 2005-269411 | | 3/2004 |
| JP | 2005269411 A | * | 9/2005 |

OTHER PUBLICATIONS

"Telecommunications and Internet Converged Services and Protocols for Advanced Networking (TISPAN); NGN Functional Architecture; Network Attachment Sub-System (NASS)", ETSI ES 282 004, V1.1.1 (Jun. 2006), pp. 1-2 and 15-16.
"3rd Generation Partnership Project 2, 3GPP2," Network Presence, pp. 1-11.

* cited by examiner

*Primary Examiner* — Ian N Moore
*Assistant Examiner* — Jackie Zuniga
(74) *Attorney, Agent, or Firm* — Stites & Harbison PLLC; Juan Carlos A. Marquez, Esq.; Stephen J. Weyer, Esq.

(57) ABSTRACT

In a cache control assuming plural user terminals accessing identical content, cache delete priority assignment is performed from a position where a user finished playback based on whether the user intends to view the content later. A cache control server is provided, and a cache delete inhibit span is determined based on a playback stop position or a normal speed playback time. A cache server deletes the cache based on the delete inhibit span received from the cache control server. Traffic of the core network due to re-cache can thus be reduced.

6 Claims, 26 Drawing Sheets

FIG. 6

29
CACHE STATUS TABLE (CACHE CONTROL SERVER)

| | CONTENT ID (400) | DATA SIZE (MB) (405) | RESUME INTENTION CRITERIA (SPECIFIED BY STOP POSITION RANGE) | CACHE SERVER ID (401) | VIEWING USER ID (402) | DELETE INHIBIT SPAN (404) |
|---|---|---|---|---|---|---|
| 29-1 | Content1 | 4000 | 0 TO 100, 12000 TO 12345 | rtsp://example1.com | Sip:user1.example.com<br>Sip:user2.example.com<br>Sip:user3.example.com | UP TO 12.00 ON 1 JANUARY, 2007 |
| 29-2 | Content2 | 2400 | 0 TO 100, 23000 TO 23456 | rtsp://example2.com | Sip:user11.example.com<br>Sip:user12.example.com<br>Sip:user13.example.com | UP TO 12.00 ON 2 JANUARY, 2007 |
| | | | | rtsp://example1.com | NONE | DELETE ALLOWED |
| | | | | rtsp://example3.com | Sip:user14.example.com<br>Sip:user15.example.com | UP TO 14.00 ON 4 JANUARY, 2007 |
| 29-3 | Content9 | 1000 | 0 TO 150, 34000 TO 34567 | NONE | NONE | NONE |

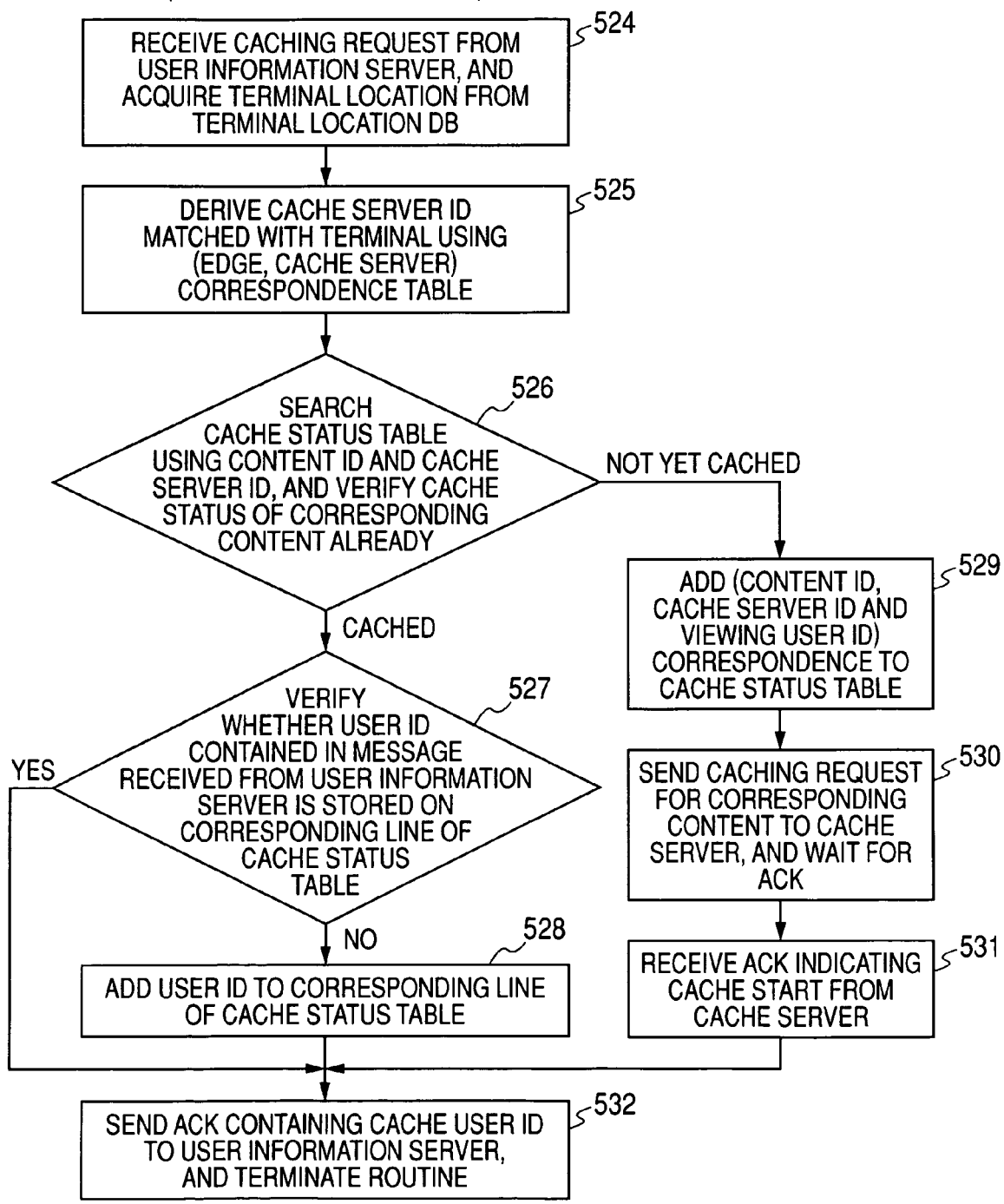

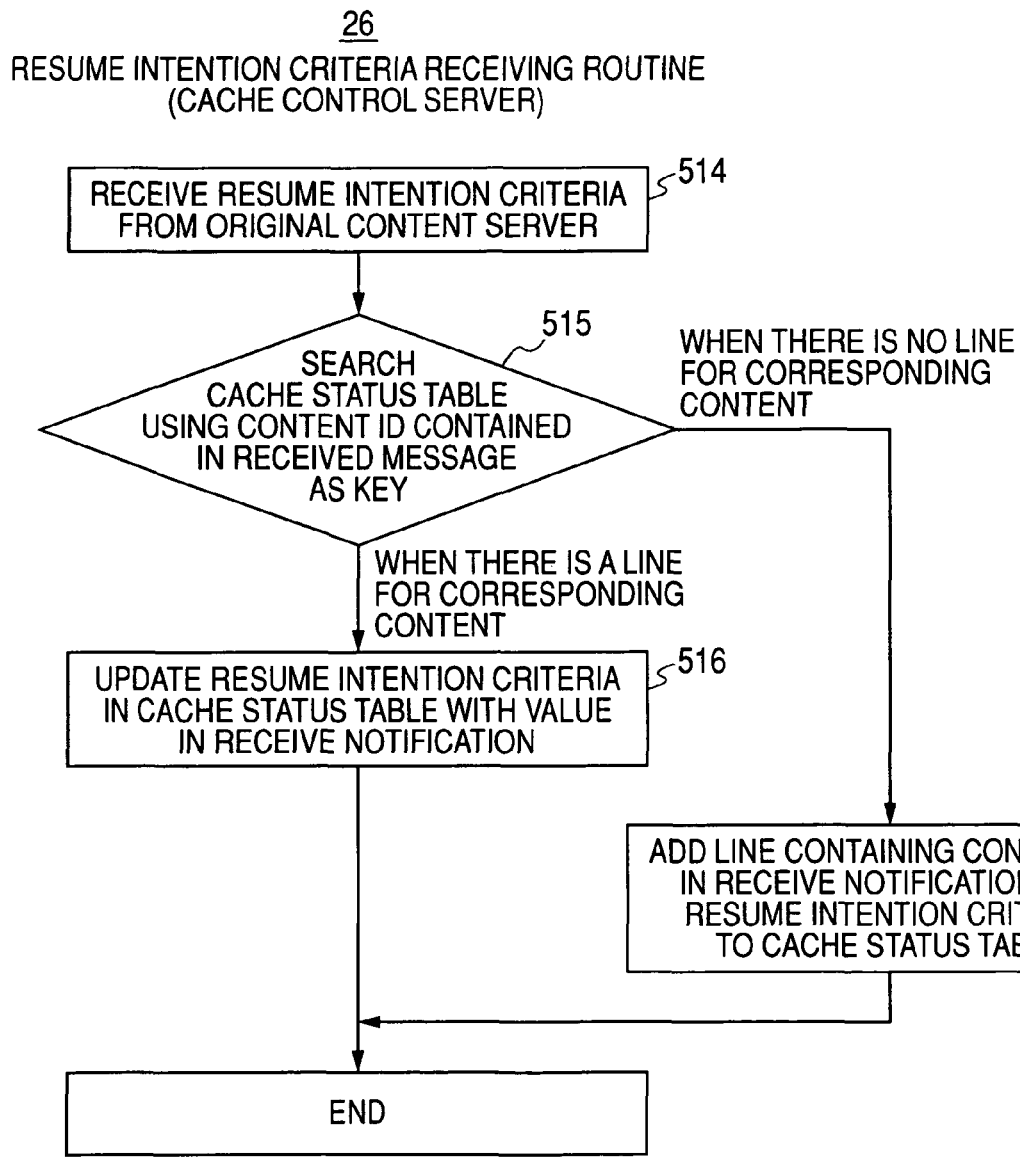

FIG. 10A

44
DELETE PRIORITY LIST a (CACHE SERVER)

| CONTENT ID (410) | DELETE INHIBIT SPAN (411) | POINTER (412) |
|---|---|---|
| Content7 | TO 20.00 ON 5 JANUARY, 2007 | Content5 |
| Content5 | TO 06.00 ON 4 JANUARY, 2007 | Content3 |
| Content3 | TO 13.00 ON 3 JANUARY, 2007 | Content1 |
| Content1 | TO 12.00 ON 1 JANUARY, 2007 | Content4 |
| Content4 | TO 18.00 ON 31 DECEMBER, 2006 | Content2 |
| Content2 | DELETION ALLOWED | Content6 |
| Content6 | DELETION ALLOWED | Head |

Rows: 44-1 through 44-7

FIG. 10B

44
DELETE PRIORITY LIST b (CACHE SERVER)

| CONTENT ID (410) | DELETE INHIBIT SPAN (411) | POINTER (412) |
|---|---|---|
| Content7 | TO 20.00 ON 5 JANUARY, 2007 | Content5 |
| Content5 | TO 06.00 ON 4 JANUARY, 2007 | Content3 |
| Content3 | TO 13.00 ON 3 JANUARY, 2007 | Content1 |
| Content1 | TO 12.00 ON 1 JANUARY, 2007 | Content4 |
| Content4 | TO 18.00 ON 31 DECEMBER, 2006 | Content2 |
| Content2 | DELETION ALLOWED | Head |

Rows: 44-1 through 44-6

FIG. 10C

44
DELETE PRIORITY LIST c (CACHE SERVER)

| CONTENT ID (410) | DELETE INHIBIT SPAN (411) | POINTER (412) |
|---|---|---|
| Content7 | TO 20.00 ON 5 JANUARY, 2007 | Content5 |
| Content5 | TO 06.00 ON 4 JANUARY, 2007 | Content3 |
| Content3 | TO 13.00 ON 3 JANUARY, 2007 | Content1 |
| Content1 | TO 12.00 ON 1 JANUARY, 2007 | Content8 |
| Content4 | TO 18.00 ON 31 DECEMBER, 2006 | Content2 |
| Content2 | DELETION ALLOWED | Head |
| Content8 | TO 11.00 ON 1 JANUARY, 2007 | Content4 |

(rows: 44-1, 44-2, 44-3, 44-4, 44-5, 44-6, 44-8)

FIG. 10D

44
DELETE PRIORITY LIST d (CACHE SERVER)

| CONTENT ID (410) | DELETE INHIBIT SPAN (411) | POINTER (412) |
|---|---|---|
| Content7 | TO 20.00 ON 5 JANUARY, 2007 | Content5 |
| Content5 | TO 06.00 ON 4 JANUARY, 2007 | Content8 |
| Content3 | TO 13.00 ON 3 JANUARY, 2007 | Content1 |
| Content1 | TO 12.00 ON 1 JANUARY, 2007 | Content4 |
| Content4 | TO 18.00 ON 31 DECEMBER, 2006 | Content2 |
| Content2 | DELETION ALLOWED | Head |
| Content8 | TO 21.00 ON 3 JANUARY, 2007 | Content3 |

(rows: 44-1, 44-2, 44-3, 44-4, 44-5, 44-6, 44-8)

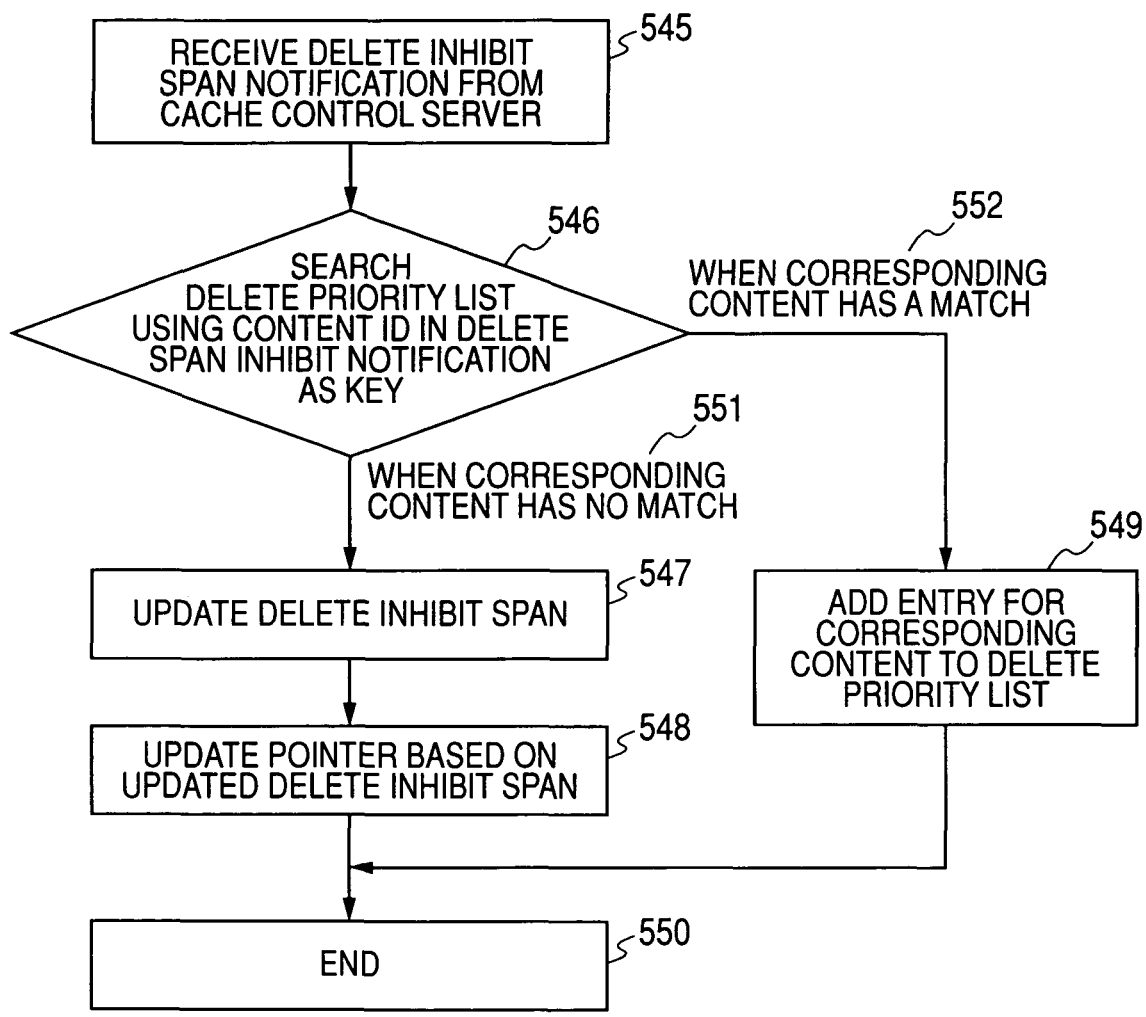

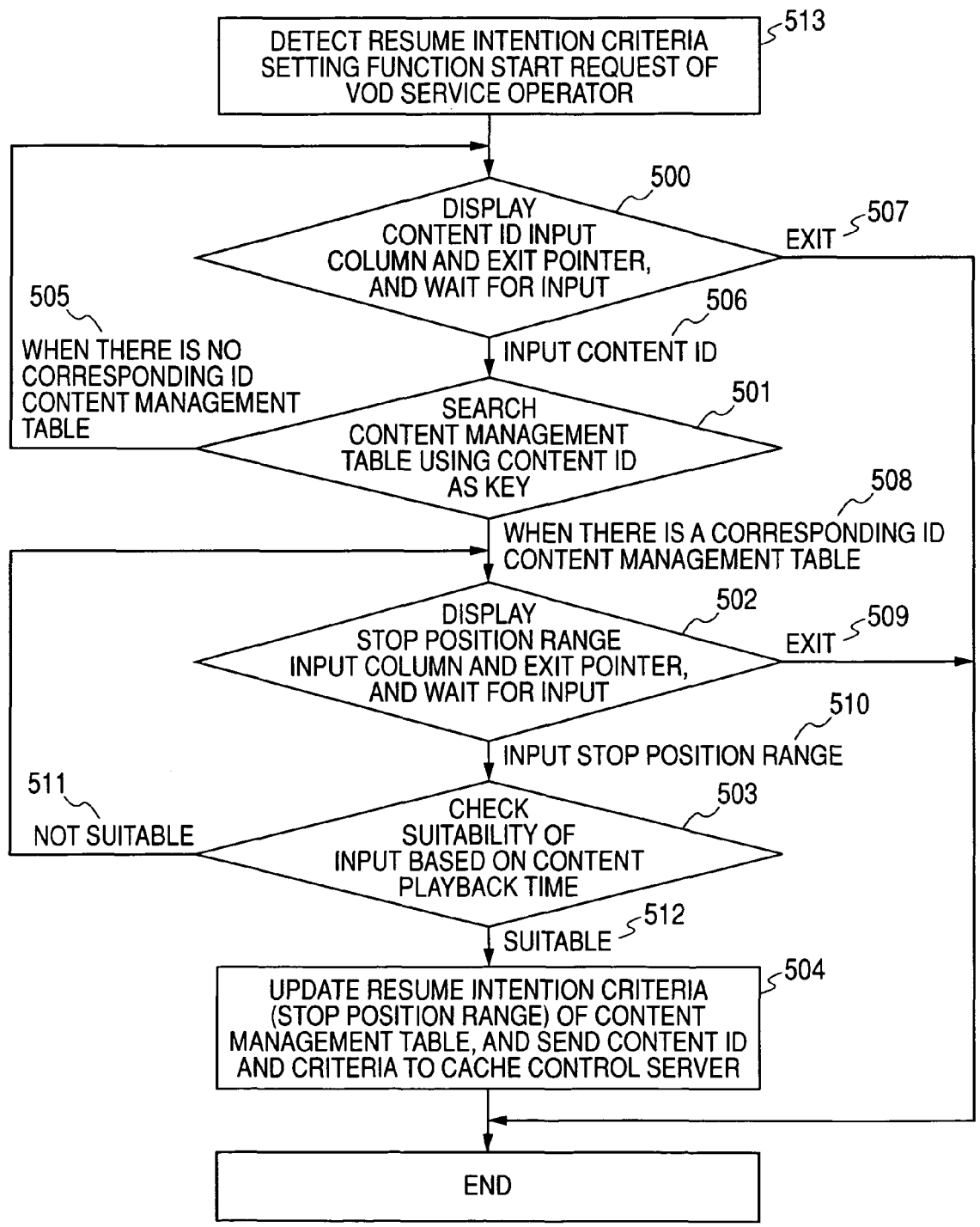

FIG. 13

56
CONTENT MANAGEMENT TABLE (ORIGINAL CONTENT SERVER)

| CONTENT ID ⌒420 | TITLE ⌒421 | RESUME INTENTION CRITERIA (SPECIFIED BY STOP POSITION RANGE) ⌒422 | TOTAL PLAYBACK TIME ⌒423 | DATA SIZE (MB) ⌒424 |
|---|---|---|---|---|
| Content1 | Title1 | 0 TO 100, 12000 TO 12345 | 12345 | 4000 |
| Content2 | Title2 | 0 TO 100, 23000 TO 23456 | 23456 | 2400 |
| Content9 | Title9 | 0 TO 150, 34000 TO 34567 | 34567 | 1000 |

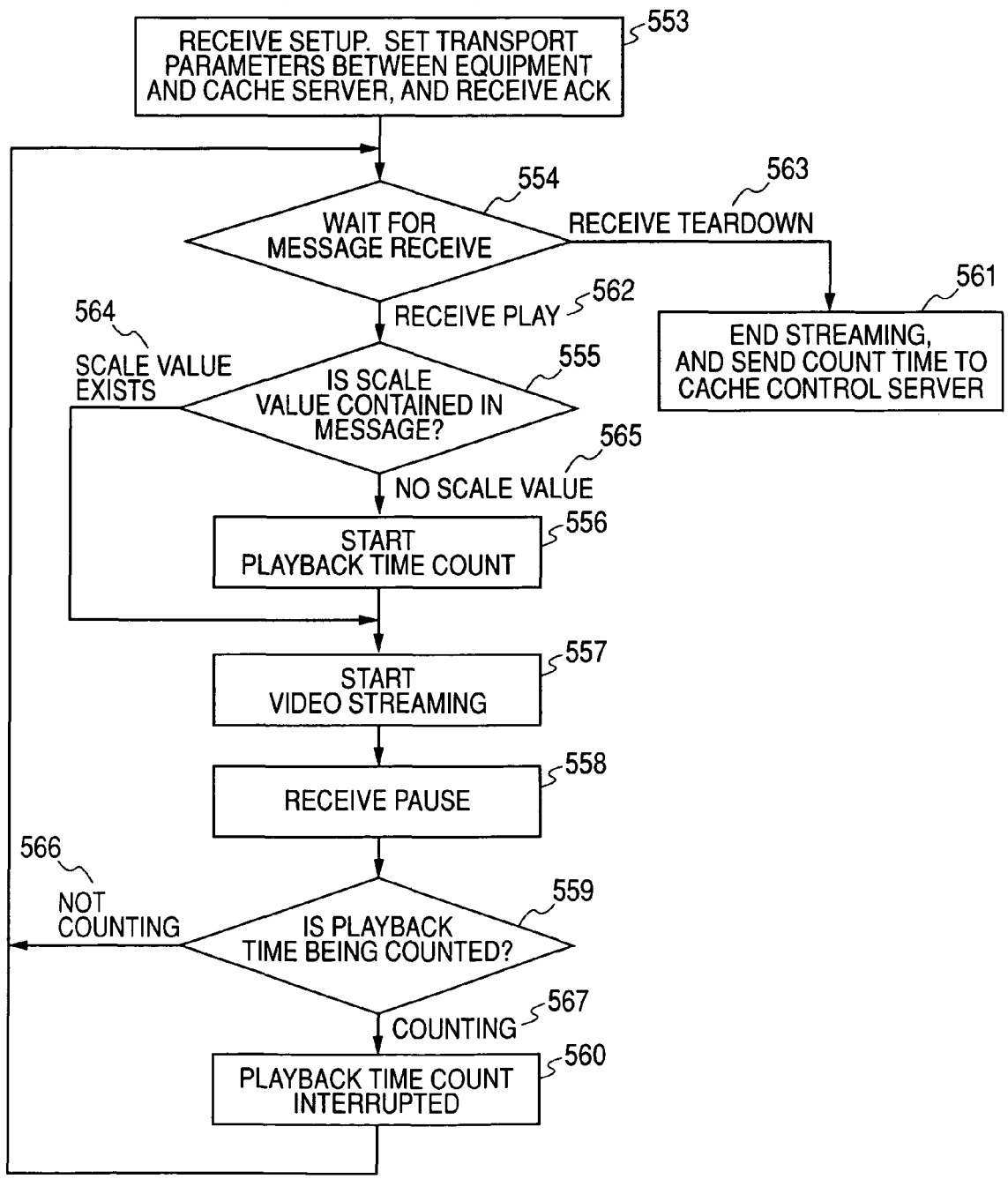

FIG. 23

29
CACHE STATUS TABLE (CACHE CONTROL SERVER)

| CONTENT ID 400 | RESUME INTENTION CRITERIA (SPECIFIED BY NORMAL SPEED PLAYBACK TIME) 430 | CACHE SERVER ID 401 | VIEWING USER ID 402 | DELETE INHIBIT SPAN 403 404 |
|---|---|---|---|---|
| Content1 | 0 TO 1000 | rtsp://example1.com | Sip:user1.example.com Sip:user2.example.com Sip:user3.example.com | TO 12.00 ON 1 JANUARY, 2007 |
| | | rtsp://example2.com | Sip:user11.example.com Sip:user12.example.com Sip:user13.example.com | TO 12.00 ON 2 JANUARY, 2007 |
| Content2 | 0 TO 2000 | rtsp://example1.com | NONE | DELETION ALLOWED |
| | | rtsp://example3.com | Sip:user14.example.com Sip:user15.example.com | TO 14.00 ON 4 JANUARY, 2007 |
| Content9 | 0 TO 2500 | NONE | NONE | NONE |

CONTENT DELIVERY SYSTEM, CACHE SERVER, AND CACHE CONTROL SERVER

CLAIM OF PRIORITY

The present application claims priority from Japanese patent application JP 2007-284142 filed on Oct. 31, 2007, the content of which is hereby incorporated by reference into this application.

The present invention relates to improvement of a system that distributes content, such as images, through a network.

BACKGROUND

In recent years, communication organizations have been studying NGN (Next Generation Networks). In the NGN architecture, a NACF (Network Attachment Control Function) manages the edge nodes of a core network, and the correspondence of user terminals connected to the edge nodes (for example, "Telecommunications and Internet converged Services and Protocols for Advanced-Networking (TISPAN); NGN Functional Architecture Release 1", ETSI ES 282 004 V1.1.1, Section 5.3.2; [online], searched on Oct. 4, 2007, Internet.

In NGN, an IMS (IP Multimedia Subsystem) is applied to session control.

IMS is being designed by the 3GPP ($3^{rd}$ Generation Partnership Project) and 3GPP2 ($3^{rd}$ Generation Partnership Project 2) that aim to standardize 3rd generation mobile radio communication networks. 3GPP2 manages correspondence information about user terminals and PDSN (Packet Data Serving Nodes) that are edge nodes, and node AAA (Authentication, Authorization, and Accounting) is performed to authenticate connection of the user terminal with the PDSN. When a presence function is provided on IMS, a presence server can acquire the correspondence information about the user terminals and PDSN. For example, the presence function can grasp the current status of a user on the network. Specifically, the presence server can acquire correspondence information about user terminals and the PDSN from the Authentication node AAA via a node PNA (Presence Network Agent) that relays presence information (for example, 3GPP2 X. P0027-004-0 v1.0 V&V Network Presence Section 4, [online], searched on Oct. 4, 2007, Internet.

At the same time, standardization of IPTV (Internet Protocol TeleVision) that is now attracting attention as a promising NGN service, is-being promoted by the ITU-T (International Telecommunication Union Telecommunication Standardization Sector) FG-IPTV (Focus Group-IPTV). In VOD (Video On Demand) that is one type of IPTV service, a content distribution server distributes image content by unicast to user terminals. In VOD, there is a system that streams content, and a system that downloads content to the user terminal.

An example of content playback control protocol is RTSP (Real-time Streaming Protocol), and an example of streaming data transfer protocol is RTP (Real Time Protocol). Both RTSP and RTP are protocols specified by the IETF (Internet Engineering Task Force), and are generally used with a streaming service.

To distribute content efficiently at high speed, CDN (Contents Delivery Network) is usually used. In CDN, part or all of the content held by an original content server is saved on a cache server, and then distributed. A user terminal accesses the cache server or a mirror server near the user terminal instead of accessing the original content server, and receives the desired content. In prior art CDN technology, the content saved on the cache server is deleted at suitable intervals according to the content, and re-cache is performed upon a subsequent request (for example, Hiroshi Kobayashi, Hiroshi Ezaki, "Internet Overview", published by Kyoritsu Shuppan, Co., Ltd., Jan. 25, 2002, page 111).

As an example of a content delivery system which allows plural users to view the same content, JP-A-2005-269411 discloses that a device on the server side manages playback stop position information for each user terminal. When the user terminal starts the VOD service again, the playback stop position information is used in order to start playback from the position where viewing stopped on the immediately preceding occasion.

SUMMARY

To provide VOD to a large number of user terminals, access concentration at an original content server must be avoided. To avoid access concentration at the original content server, a prior art communications network provides a cache server.

However, if caching is performed frequently, the traffic of the core network will increase due to data transfer from the original content server to the cache server.

At a user terminal, viewing of content may be stopped and a playback start may be performed later from the point where viewing finished. However, in the prior art CDN technology, the content saved on the cache server was deleted from the caching time or last access time after a fixed time had elapsed, whether or not it might be played back later. Specifically, the content was deleted after a predetermined time had elapsed even if a given user terminal had viewed part of the content, and stopped viewing. As a result, if the user terminal re-viewed the content after playback had stopped, the traffic of the core network increased due to re-cache. Also, the processing amount of the original content server accompanying re-cache increased. Moreover, when the user terminal played back the content, latency occurred due to re-caching.

It is therefore a purpose of the present invention, in cache control where plural user terminals access the same cache content, to perform prioritization of cache delete based on the probability of viewing content from a part where a user finished playback. As a result, it aims to provide a cache content management system that permits traffic reduction of the core network accompanying re-cache, load reduction of the original content server, and reduction of user latency in a system that provides a streaming VOD service.

The present invention is, therefore, a content delivery system that includes: a content distribution site that distributes a playback request from a user terminal, a cache server connecting the content distribution site and the user terminal, and temporarily storing the content distributed from the content distribution site, and a cache control server that controls the content held by the cache server, the cache control server having: a cache control unit that sets a delete inhibit span of the content stored in the cache server according to the playback status of the content of the user terminal, and a delete inhibit span notification unit that notifies the cache server of the content delete inhibit span, in which the cache server includes: a storage device that temporarily stores the content distributed by the content distribution site to the cache server; a content providing unit that sends the content stored in the storage device to the user terminal; a delete priority management unit that sets a delete priority for the content stored in the storage device based on the delete inhibit span received from the cache control server; and a content management unit that deletes content based on priority, when new content is stored from the content distribution site, and there is no vacant area in the storage device of the cache server.

In the present invention, the cache control server that manages the cache status of a cache server sets a delete inhibit span of cache content read by a cache server based on playback stop position information or the playback time at a predetermined speed (for example, normal speed). The cache control server sends the delete inhibit span to the cache server, and the cache server determines the delete priority of the cache content based on the delete inhibit span. Due to this, deletion of content that the user had not finished viewing is inhibited.

As a result, after a user temporarily stops playback, re-caching when the information is re-viewed is reduced. By reducing re-caching of the content, traffic reduction in the core network, load reduction of the original content server, and reduction of user latency can be achieved.

BRIEF DESCRIPTION OF THE DRAWINGS

FIG. 6 is a diagram of the first embodiment, showing an example of a cache status table;

FIG. 7 is a flow chart of the first embodiment, showing an example of a caching request sending routine;

FIG. 9 is a flow chart of the first embodiment, showing an example of a resume intention criteria receiving routine;

FIG. 10a is a diagram of the first embodiment, showing an example of a delete priority list of the cache server;

FIG. 10b is a diagram of the first embodiment, showing an example after updating the delete priority list of the cache server;

FIG. 10c is a diagram of the first embodiment, showing another example after updating the delete priority list of the cache server;

FIG. 10d is a diagram of the first embodiment, showing another example after updating the delete priority list of the cache server;

FIG. 11 is a flow chart of the first embodiment, showing an example of a delete inhibit span receiving routine of a delete priority list maintenance function of a cache server;

FIG. 12 is a flow chart of the first embodiment, showing a resume intention criteria setting routine with which a content management function of the original content server is provided;

FIG. 13 is a descriptive diagram of the first embodiment, showing an example of a content management table with which the original content server is provided;

FIG. 22 is a flow chart of the second embodiment, showing an example of a normal speed playback time measurement routine with which a delete priority list maintenance function of a cache server is provided;

FIG. 23 is a descriptive diagram of the second embodiment, showing a cache status table with which the cache control server is provided;

DETAILED DESCRIPTION OF THE PREFERRED EMBODIMENTS

One embodiment of the present invention will be described hereafter referring to the accompanying drawings.

Figure 1:
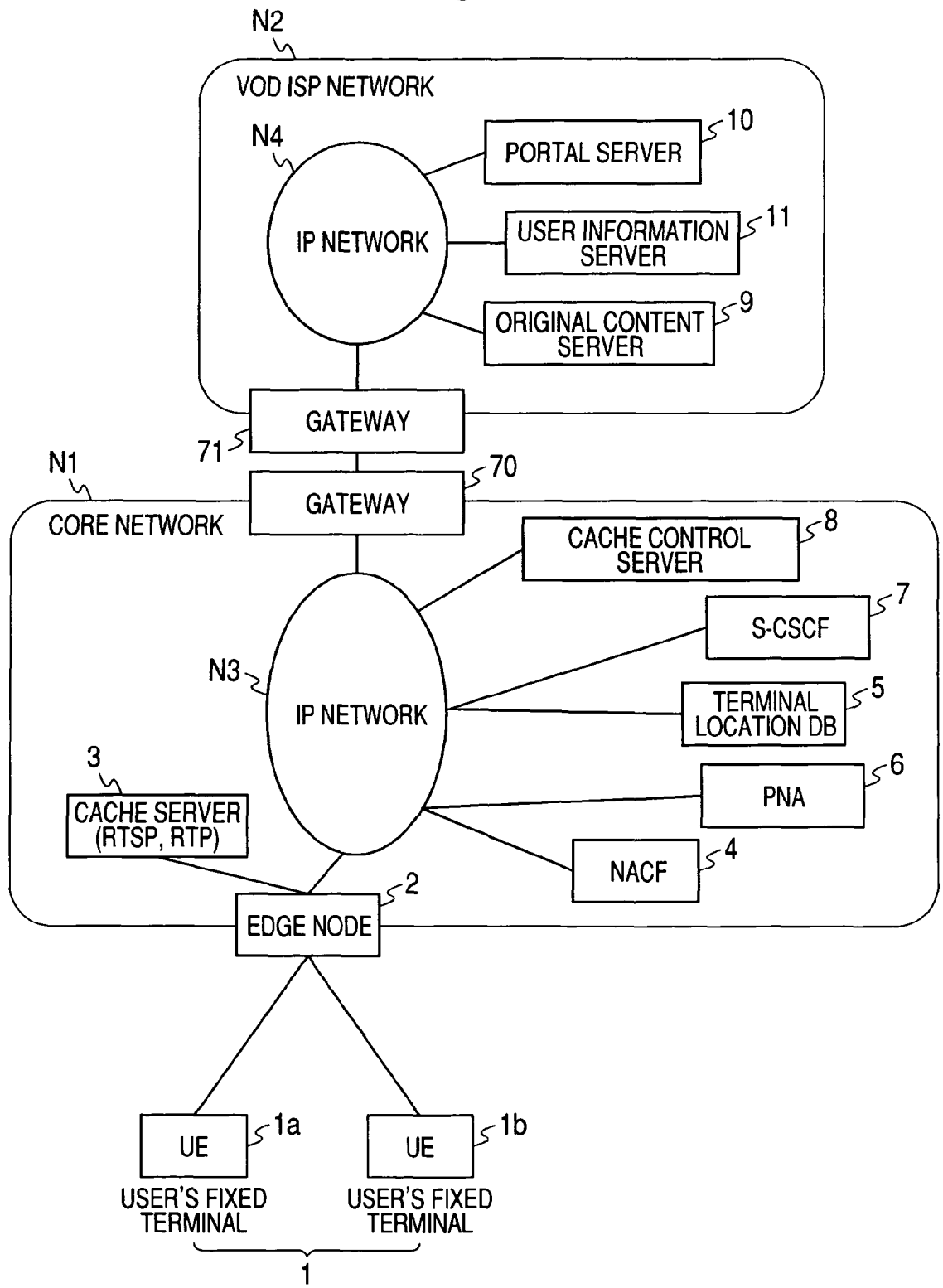
FIG. 1 is a block diagram of a first embodiment, showing a typical example of communications systems to which the present invention is applied.

FIG. 1 is a block diagram of a first embodiment showing an example of a VOD (Video On Demand) distribution network to which the present invention is applied.

The VOD distribution network according to the present invention includes a core network N1, VOD service provider network that provides a VOD service (hereafter, VOD_ISP network) N2, and user terminal UE1. The VOD_ISP network N2 functions as a content distribution site that provides content to the user terminal UE1 side.

The core network N1 includes an IP network N3, edge node 2, cache server 3, NACF (Network Attachment Control Function) 4, terminal location DB (Database) 5, PNA (Presence Network Agent) 6, S-CSCF (Serving-Call Session Control Function) 7, and cache control server 8. The IP network N3 is an IP network that includes a router and switches, an edge node 2, the NACF4, terminal location DB5, S-CSCF7, and the cache control server 8 which is connected to the IP network N3.

The edge node 2 is a connection point with the access network (network on the user terminal UE side) located on the edge (boundary of the core network N1) of the core network N1, and which terminates the IP network N3. The core network N1 interconnects with the VOD_ISP network N2, for which purpose the gateway unit 70 is connected with the IP network N3.

When the gateway unit 70 communicates between a component node of the core network N1 and a component node of the VOD_ISP network N2, it is determined whether connection is possible based on the sending origin address contained in a packet.

The cache server 3 is provided with a RTSP server function and a RTP server function which caches the content. The cache server 3 sends and receives RTSP messages to and from the user terminal UE1 (1a, 1b), and distributes the cache content to the user terminal UE1. NACF4 is a server that authenticates/approves connection with the edge node 2 of the user terminal UE1, and performs IP address assignment to the user terminal UE1. In FIG. 1, one edge node 2 and one cache server 3 were shown, but the core network N1 is actually provided with plural edge nodes 2 and plural cache servers 3. One cache server 3 and edge node 2 are disposed in each predetermined area, and the cache server 3 distributes content to the user terminal UE1 of the predetermined area via the edge node 2. Specifically, the core network N1 functions as a relay network that connects the VOD_ISP network N2 and the user terminal UE1 of each area.

The terminal location DB5 holds correspondence information about the edge node 2 to which the user terminal UE1a and UE1b are connected. PNA6 is a relay node (relay server) for sending the correspondence information about the edge node 2 to which the user terminal UE1a and UE1b under NACF4 are connected, to the terminal location DB5. S-CSCF7 is an SIP (Session Initiation Protocol) server, and it performs control and management of the session status.

The VOD_ISP network N2 includes an IP network N4, an original content server 9, a portal server 10, and a user information server 11. The IP network N4 is an IP network that includes a router and switches. The original content server 9, the portal server 10, and the user information server 11 are connected to the IP network N4. The VOD_ISP network N2 is mutually interconnected with the core network N1, for which purpose the gateway unit 71 is connected to the IP network N4.

When the gateway unit 71 communicates between the component node of the core network N1, and the component node of the VOD_ISP network N2, it is determined whether connection is possible based on the sending origin address contained in a packet.

The original content server 9 stores information about content data and content, and has an interface via which the administrator of the VOD_ISP network N2 inputs information about the content. The original content server 9 also has a RTSP server function and a RTP server function, a function that sends and receives RTSP messages to and from the user terminal UE1, a function that distributes content to the user terminal UE1, and a function that sends content data to the cache server 3.

The portal server 10 provides a Web Service to the user terminal UE1 for the purpose of guiding a user (user of the user terminal UE1) to the content.

The portal server 10 receives a user's viewing request (playback request) from the user terminal UE1, and sends the URL of the content to the user terminal UE1.

The user information server 11 stores user-specific information, including a user's subscription information, the viewing stop position in the content, etc.

The viewing stop position information is managed so as to provide a resume playback function.

In general, the resume playback function points to a viewing resume action after a user stops viewing the content on the user terminal UE1 (PAUSE). In this embodiment, the viewing resume action is performed not only after PAUSE, but also after STOP.

Due to the resume playback function, the user can start playback from the position where viewing finished even after the user logs off from the VOD service and logs in again.

The position from which viewing of content resumes may be the position at which viewing finished at the time of the last viewing, or it may be a position rewound several seconds before the part where viewing finished. If the position from which viewing of content resumes is the position rewound several seconds before the part where viewing finished, when a user resumes viewing after a certain time, he can still remember the content of the story that he was previously viewing.

In this embodiment, when a user stops viewing the content (STOP) and there is an intention to resume viewing later, "to be resumed later" is displayed. On the other hand, when a user stops viewing (STOP) and there is no intention to resume viewing later, "not to be resumed later" is displayed.

The user terminal UE1 is a user terminal such as a television corresponding to IPTV installed in a user's house. The user terminal UE1 has a browser function that displays a portal screen, and an AV player function that displays a received image.

Alternatively, the user terminal UE1 may be a component that combines a television and a STB (Set Top Box), for example.

The cache server 3 is connected to the edge node 2 of the core network N1. By connecting the cache server 3 to the edge node 2, the traffic in the core network N1 generated when the user terminal UE1 receives an image can be reduced.

In addition, a router may be installed instead of the gateway unit 70 and the gateway unit 71 of the core network N1 and the VOD_ISP network N2.

When the PNA6 connects with the NACF4 and the terminal location DB5 via the IP network N3, the terminal location DB5 can then acquire correspondence information about the edge node 2 to which the user terminal UE1a and UE1b are connected.

Figure 2:
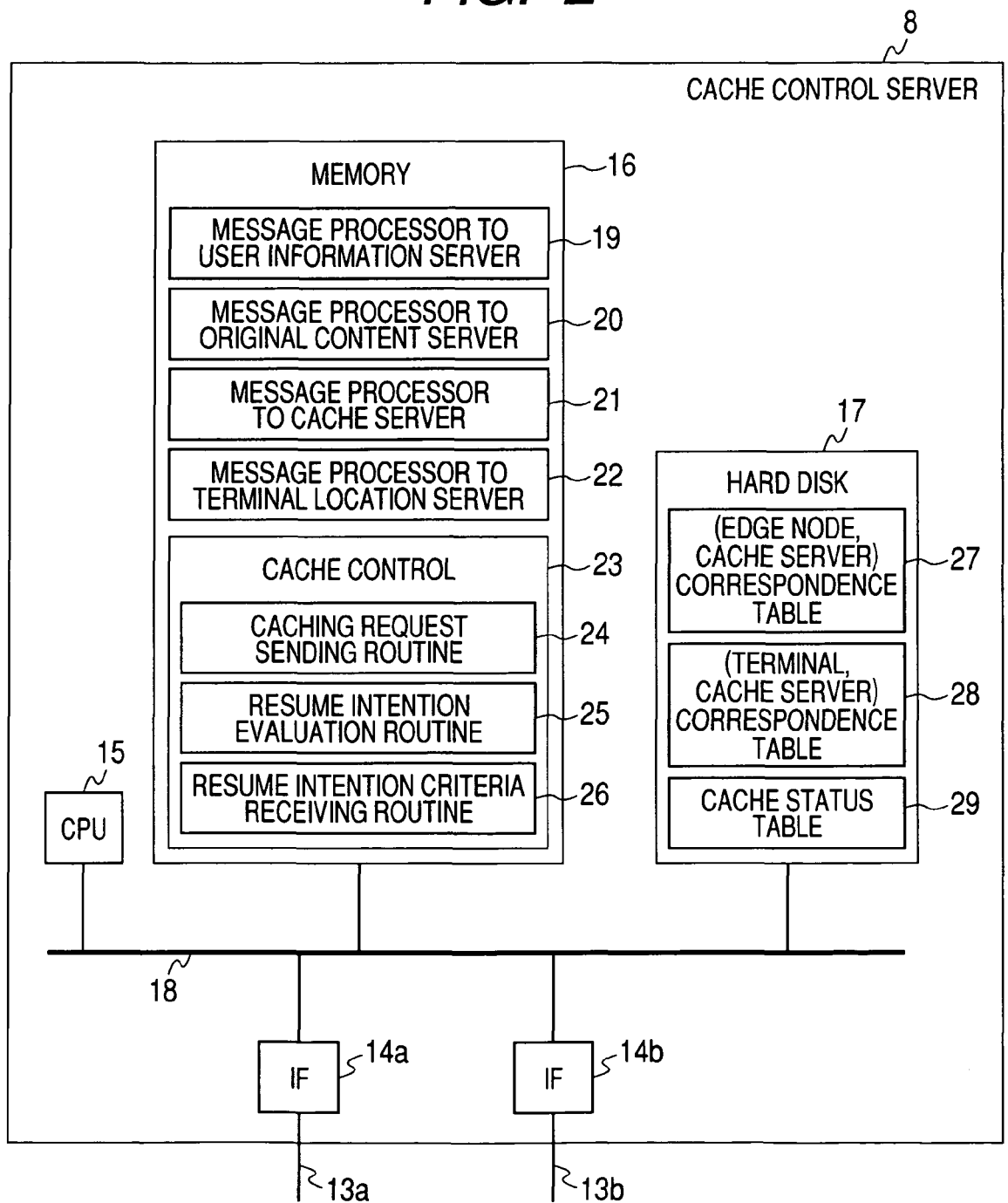
FIG. 2 is a block diagram of the first embodiment, showing the construction of a cache control server.

FIG. 2 is a block diagram showing an example of the components of the cache control server 8. The cache control server 8 has an interface unit (IF) 14 (14a, 14b) that accommodates a circuit 13 (13a, 13b) connected to the IP network N3, a CPU15, a memory 16, and a hard disk 17. These components are connected by a bus 18.

The memory stores a program that performs message processing-19 for the user information server, a program that performs message processing 20 for the original content server, a program that performs message processing 21 for the cache server, a program that performs message processing 22 for the terminal location server, and a program that performs a cache control function 23.

The message processing 19 for the user information server has a function to send or receive messages between the cache control server 8 and the user information server 11. The message processing 20 for the original content server has a function to send or receive messages between the cache control server 8 and the original content server 9. The message processing 21 for the cache server has a function to send or receive messages between the cache control server 8 and the cache server 3. The message processing 22 for the terminal location server has a function to send or receive messages between the cache control server 8 and the terminal location DB5.

The cache control function 23 has a caching request sending routine 24, a resume intention evaluation routine 25, and a resume intention criteria receiving routine 26. The caching request sending routine 24 processes a caching request received from the user information server 11, and a caching request sent to the cache server 3. The resume intention criteria receiving routine 26 is a function that acquires criteria used to evaluate the resume intention of the user terminal UE1 from the original content server 9. The criteria is represented by the viewing stop position range in the preset content. When playback of content is stopped within the range specified by the criteria, it is determined that there is no resume intention. The resume intention evaluation routine 25 evaluates the resume intention of the user terminal UE1 based on the position at which the user terminal UE stopped playback of content, and the resume intention criteria received from the original content server 9. The resume intention evaluation routine 25 also sets a delete inhibit span for deleting the cache content based on the evaluated resume intention, and notifies the cache server 3. Since the cache control server 8 sets the delete inhibit span based on the user's resume intention, and this is sent to the cache server 3 by the resume intention criteria receiving routine 26 and the resume intention evaluation routine 25, the cache server 3 can save the content preferentially when the user has an intention to resume viewing.

The hard disk 17 stores an (edge node, cache server) correspondence table 27, a (terminal, cache server) correspondence table 28, and a cache status table 29. The (edge node, cache server) correspondence table 27 is a table that manages correspondence information about the IP address of the edge node 2, the RTSP_URL of the cache server 3 used by the user terminal UE1 connected to the edge node 2 and the SIP_URI of the cache server 3, and is preset by the communications company (administrator of the VOD_ISP network N2). The (terminal, cache server) correspondence table 28.manages correspondence information about the SIP_URI of the user terminal UE1 and the SIP_URI of the cache server 3 used by the user terminal UE1. The (terminal, cache server) correspondence table 28 is updated based on the (terminal, edge node) correspondence information acquired by the cache control server 8 from the terminal location DB5, and the (edge node, cache server) correspondence table 27.

FIG. 6 shows an example of the components of the cache status table 29 stored in the cache control server 8. The cache status table 29 stores correspondence information about a content ID 400, data size 405, resume intention criteria 401, cache server ID 402, a viewing user ID 403 that stores the identifier of the user terminal UE1 viewing the content, and a delete inhibit span 404 that stores a period during which deletion of content cached by the cache server 3 is inhibited.

The content ID 400 is an ID that uniquely identifies the content. The data size 405 is the file size of the content data. The resume intention criteria 401 is a standard for evaluating a user's intention to resume or terminate viewing according to the playback stop position in the content, and is input to the original content server 9 by the administrator of the VOD_ISP network N2, etc. If a user stops content playback within the range specified by the resume intention criteria 401, it is determined that the user has no resume intention. When the cache status table 29 stores the resume intention criteria 401, the cache control server 8 can determine a user's resume intention based on the stop position information. For example, the first several minutes of the content is specified as a resume intention criteria (for example, 0 to 100 seconds in the figure). As a result, if a user views the first several minutes of the content, decides that it is not interesting and stops viewing, the cache control server 8 can determine that the user does not have a resume intention. It is also possible to specify the final several minutes of the content as a resume intention criteria (for example, 12000 to 12345 seconds in the figure) In this case, when a user has finished viewing most of the content and only the ending theme remains, the cache control server 8 can determine that the user does not have a resume intention. Conversely, the cache control server 8 can determine that the user does have a resume intention when a user stops playback within a range that is not specified by the resume intention criteria.

The cache server ID 402 is an identifier of the cache server 3 holding the content identified by the content ID 400. The RTSP_URL is used as an identifier of the cache server 3. The cache status table 29 stores the ID of all the cache servers 3 holding the content identified by the content ID 400 under one content ID 400.

The viewing user ID 403 is a list of users determined to have viewed part of the content, and having a resume intention. The list of users is held as correspondence information in each of the cache servers 3. The SIP_URI is used as an identifier of a viewing user, for example.

The delete inhibit span 404 represents the delete inhibit span of the content, and is set by the cache control server 8 for each cache server ID 402 for the respective content ID 400. The cache control server 8 starts the resume intention evaluation routine 25, and sets the delete inhibit span 404 based on whether there is a viewing user, and the last access time of the viewing user ID 403. For example, the delete inhibit span 404 can be determined by adding a predetermined time to the last access time, and the cache control server 8 can also determine it by adding a time according to the number of viewing user IDs. When the number of viewing user IDs is 0, or when a viewing user does not have a resume intention, the delete inhibit span is set to "delete allowed." Since the cache status table 29 stores the delete inhibit span 404, the cache control server 8 can manage the delete inhibit span for the cache content.

The cache control server 8 is provided with a message processing 19 for the user information server, and a message processing 20 for the original content server. As a result, it can look up the playback stop position information held by the user information server 11, and the resume intention criteria saved by the VOD_ISP network N2 in the original content server 9, and perform control according to the disposition of the cache server 3.

Figure 3:
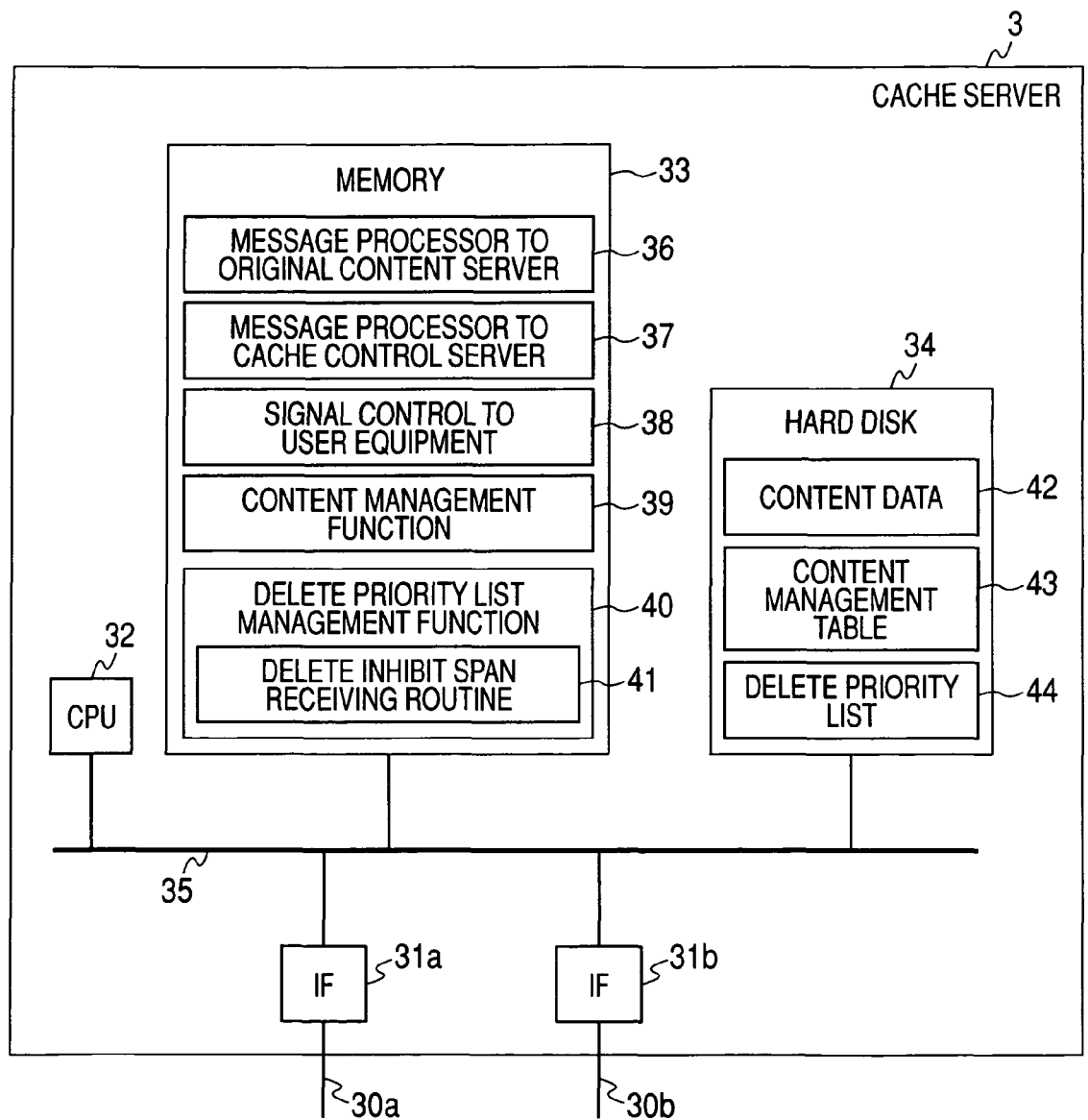
FIG. 3 is a block diagram of the first embodiment, showing the construction of a cache server.

The components of the cache server 3 are shown in FIG. 3. The cache server 3 has an interface unit (IF) 31 (31a, 31b) that accommodates the circuit 30 (30a, 30b) connected to the edge node 2, CPU32, a memory 33, and a hard disk 34. These components are connected by a bus 35.

The memory 33 stores a program that performs message processing 36 for the original content server, a program that performs message processing 37 for the cache control server, a program that performs signal control 38 for a user terminal, a program that performs a content management function 39, and a program that performs a delete priority list maintenance function 40.

The message processing 36 for the original content server has a function to send or receive messages between the cache server 3 and the original content server 9. The message processing 37 for the cache control server has a function to send or receive messages between the cache server 3 and the cache control server 8.

The signal control 38 for a user terminal has a function to send or receive signals between the cache server 3 and the user terminal UE1. The signal control 38 for a user terminal sends and receives RTSP messages between the cache server 3, and the user terminal UE1, and the cache server 3 distributes an image stream to UE1.

The content management function 39 performs content acquisition, and delete. If the cache server 3 does not hold the requested content when a viewing request was received from the user terminal UE1, the content management function 39 acquires the requested content from the original content server 9. Also, the content management function 39 performs cache delete as mentioned later according to the available capacity of the hard disk 34, if required.

The delete priority list maintenance function 40 has a delete inhibit span receiving routine 41. The delete inhibit span receiving routine 41 receives a delete inhibit span from the cache control server 8. The delete inhibit span receiving routine 41 updates the delete priority list 44 showing the delete priority of the cache content based on the received delete inhibit span. By providing the delete priority list maintenance function 40 with the delete inhibit span receiving routine 41, the cache server 3 can set the delete priority of the cache content using the delete inhibit span set by the cache control server 8 based on whether the user has a resume intention.

The hard disk 34 stores the content data 42, the content management table 43, and the delete priority list 44.

The content data 42 is a media data file of image content, and is a cache of the content data stored by the original content server 9.

The content management table 43 stores content-specific information including an identifier, a title, and a sum total playback time, etc. of the content data 42 saved by the cache server 3. The content management table 43 is referred to when the content management function 39 manages the cache content. The content management table 43 is also referred to when the signal control 38 for a user terminal distributes the content to UE1.

FIG. 10a shows an example of the components of the delete priority list 44. Entries 44-1 to 44-7 that constitute the delete priority list 44 include a content ID 410, a delete inhibit span 411, and a pointer 412. A value "Head" indicating the highest delete priority is stored in the pointer 412 of the entry 44-7 with the highest delete priority. The content ID of the entry 44-6 which has the first highest delete priority is stored in the pointer 412 of the entry 44-6 with the second highest delete priority. The content ID of the entry 44-6 with the second highest priority is stored in the pointer 412 of the entry 44-5 with the third highest delete priority. Thereafter, values are likewise stored in the pointer 412 based on the delete priority.

The delete inhibit span 411 may store a specific time, or time information. Alternatively, as long as the content can be deleted, information that shows that delete is allowed can be stored. The cache server 3 receives a combination of the content ID 410 and the delete inhibit span 411 from the cache control server 8 due to the delete inhibit span receiving routine 41. Since the cache server 3 manages the delete priority list 44, when the capacity of the hard disk 34 is insufficient, the content can be deleted based on the delete priority list 44. Specifically, the content management function 39 can preferentially delete the content data 42 with a short delete inhibit span by referring to the delete priority list 44.

Due to the above procedure, the cache server 3 can set a delete priority based on the delete inhibit span received from the cache control server 8.

Figure 4:
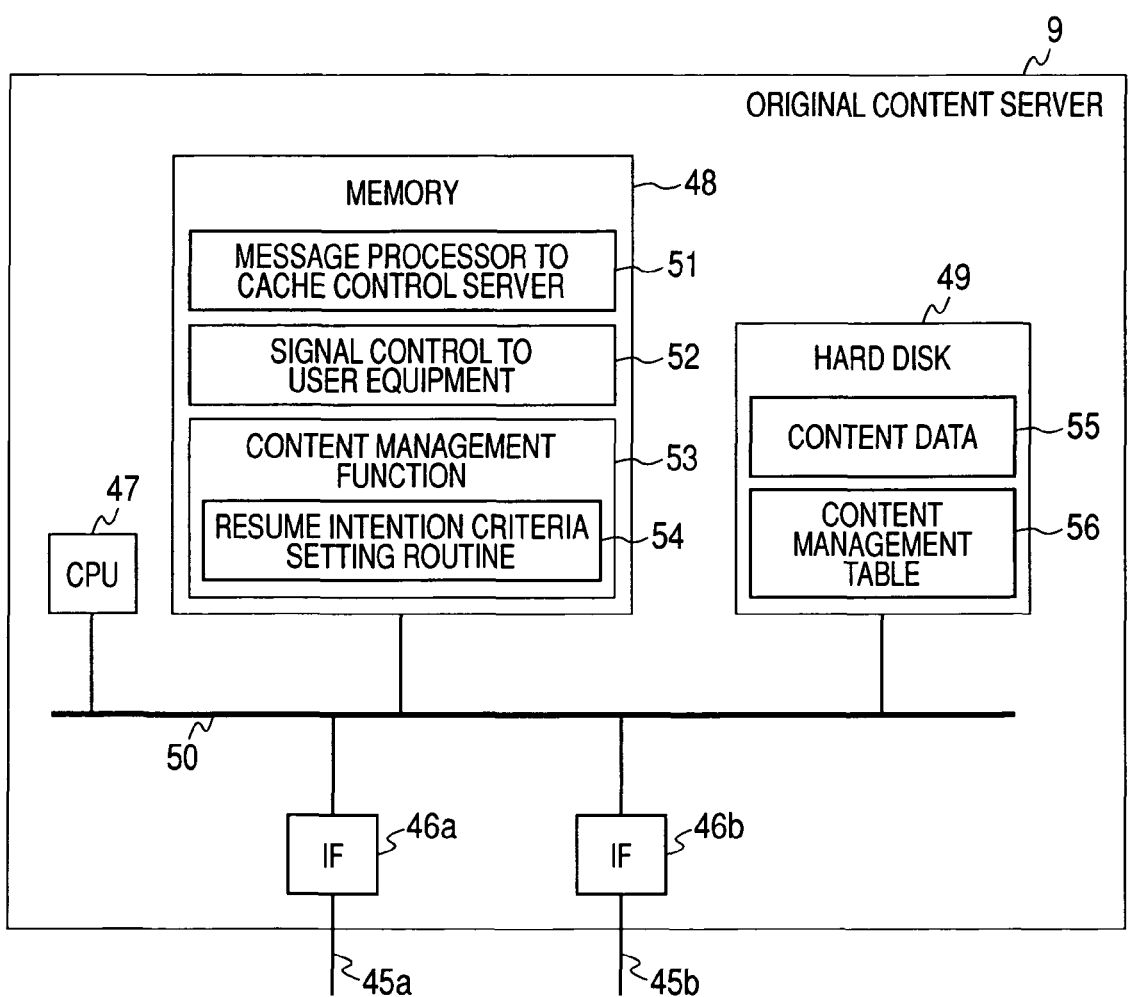
FIG. 4 is a block diagram of the first embodiment, showing the construction of an original content server.

FIG. 4 is a block diagram showing the components of the original content server 9.

The original content server 9 has an interface unit (IF) 46 (46a, 46b) that accommodates the circuit 45 (45a, 45b) connected to the IP network N4, a CPU 47, a memory 48, and a hard disk 49. These components are connected by a bus 50.

The memory 48 stores a program that performs management server signal control 51 for caching, a program that performs signal control 52 for a user terminal, and a program that performs a content management function 53.

The management server signal control 51 for caching has a function to send or receive messages between the original content server 9 and the cache control server 8.

The signal control 52 for a user terminal has a function to send and receive signals between the original content server 9 and UE1. Specifically, the signal control 52 for a user terminal performs processing that receives a content caching request from UE1, and processing that sends a content data file to UE1.

The content management function 53 manages cache content-specific information such as an identifier of the content saved by the cache server 3. The content management function 53 has a resume intention criteria setting routine 54.

The resume intention criteria setting routine 54 provides an input interface for the playback stop position range used by the administrator of the VOD_ISP network N2 as a resume intention criteria. Also, the resume intention criteria setting routine 54 checks the validity of the criteria input by the administrator of the VOD_ISP network N2, and if they are suitable, it sends the content ID and the criteria to the cache control server 8.

The hard disk 49 stores the content data 55 and the content management table 56.

The content data 55 is a media data file of image content, and is stored on the hard disk 49 by the administrator of the VOD_ISP network N2.

The content management table 56 stores information about the content data 55 saved by the original content server 9. An example of the components of the content management table 56 is shown in FIG. 13.

In FIG. 13, the content management table 56 stores a content ID 420, a content title 421, a resume intention criteria 422 set by the resume intention criteria setting routine, a sum total content playback time 423, and a content data size 424.

The original content server 9 also has an input/output interface such as a display and a keyboard, etc. in order that the administrator of the VOD_ISP network N2 can set the resume intention criteria.

By providing the original content server 9 with the resume intention criteria setting routine 54 and the content management table 56, the original content server 9 can provide the administrator of the VOD_ISP network N2 with a setting interface for the resume intention criteria. Also, the original content server 9 can send the resume intention criteria set by the administrator of the VOD_ISP network N2, to the cache control server 8.

Figure 5:
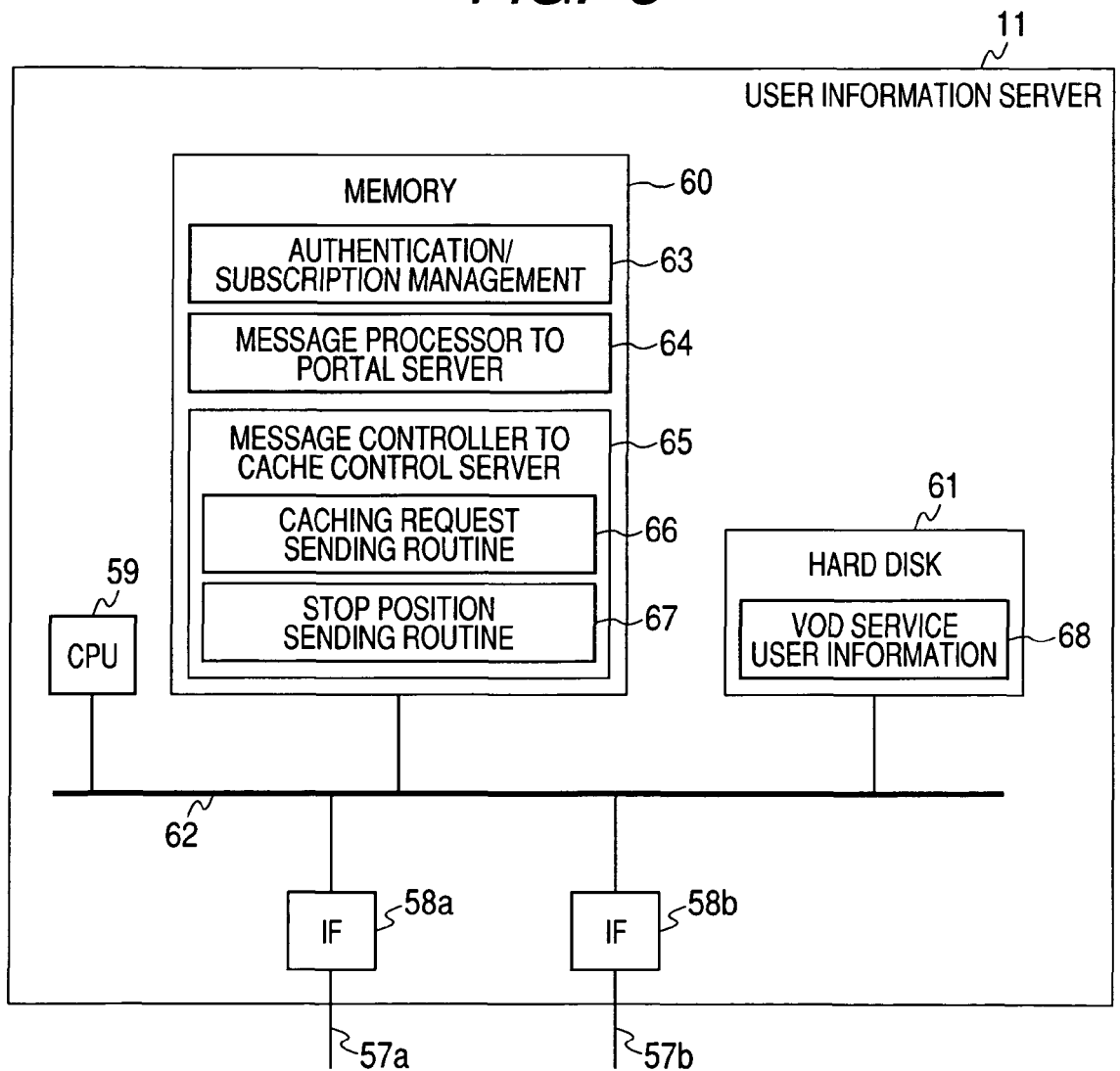
FIG. 5 is a block diagram of the first embodiment, showing the construction of a user information server.

FIG. 5 shows the components of the user information server 11. The user information server 11 has an interface unit (IF) 58 (58a, 58b) that accommodates the circuit 57 (57a, 57b) connected to the ISP network N4, a CPU 59, a memory 60, and a hard disk 61. These components are connected by a bus 62. The memory 60 has a program that performs authentication/subscription management 63, a program that performs message processing 64 for the portal server, and a program that performs message control 65 for the cache control server.

The authentication/subscription management 63 performs a VOD service member's (user of user terminal UE1) authentication processing, and subscription management. The authentication processing receives the user ID and the password entered when the VOD service member logs in to the portal service provided by the portal server 10 from the portal server 10, and compares them. The subscription management manages content information purchased by the user of the user terminal UE1, and when the user logs in to the portal service, provides content that can be viewed by the user to the portal server 10. The portal server 10 has a portal screen that a user views using the viewable content that was received.

The message processing 64 to the portal server has a function to send or receive messages between the user information server 11 and the portal server 10.

The program 65 that performs message control for the cache control server has a caching request sending routine 66 and a stop position sending routine 67.

When the user of the user terminal UE starts viewing the content, the caching request sending routine 66 receives a content viewing request from the portal server 10, and sends a content caching request to the cache control server 8. The caching request contains a SIP_URI that is a user ID, and a content ID. Since the user information server 11 is provided with the caching request sending routine 66, the user information server 11 can send a content caching request to the cache control server 8. As a result, the cache control server 8 can control the cache arrangement of the content.

When the user of the user terminal UE stops viewing the content, the stop position sending routine 67 receives a stop position from the portal server 10, and sends a stop position notification to the cache control server 8. The stop position notification sent by the user information server 11 to the cache control server 8 contains the SIP_URI that is the user ID, the content ID which the user stopped viewing, and stop position information. Since the user information server 11 is provided with the stop position sending routine 67, the user information server 11 can send the stop position information to the cache control server 8. As a result, the cache control server 8 can set the delete inhibit span 404 of the cache content based on the stop position information.

The hard disk 6 stores the VOD service user information 68. The VOD service user information 68 contains user-specific information, such as the VOD service user's authentication information, subscription information, and stop position information for each content. The authentication information contains the user ID and a password for a user to log in to the portal service. When a user logs in to the portal service, the program that performs authentication/subscription management 63 looks up the authentication information. The subscription information contains a user's subscription form, and information on the content that the user purchased. The stop position information for each content represents the position where the user stopped viewing the content, and when the user information server 11 stops viewing, the user information server 11 receives information from the portal server 10. When the user who operates the user terminal UE starts viewing using the resume playback function, the stop position information is sent to the user terminal UE1 via the portal server 10 from the user information server 11. The user terminal UE1 adds the received stop position information to the Range header of the RTSP_PLAY request as a playback start position, and sends a RTSP_PLAY request to the cache server 3 or the original content server 9.

Next, the IPv6 packet format will be described. The IPv6 packet format includes a basic header, an extension header, and a payload. The basic header contains a sender IP address and a destination IP address. Hereafter, the description will use this IPv6 packet format, but packet formats other than IPv6, for example IPv4, etc., may be used as long as the effect of the present invention is demonstrated.

Next, the packet format containing an SIP message will be described. The SIP message is stored in the data part of a transfer protocol, such as TCP/UDP. The header and data parts of the transfer protocol are stored in the payload which has the IPv6 packet format.

Next, the format of an SIP message will be described. An SIP message contains at least a start-line that shows a request or an ACK, and a header field in which a SIP parameter is set. When sending and receiving media information used for communication between terminals using a SIP message, the SIP message contains a message-body.

Next, the packet format containing a RTSP message will be described. The RTSP message is stored in the data part of a transfer protocol, such as TCP/UDP. The header and data part of the transfer protocol are stored in the payload which has the IPv6 packet format.

Next, the format of the RTSP message will be described. When the RTSP message is a request, it contains a Request-line, and when the RTSP message is an ACK, it contains a Status Line. The RTSP message also includes a header field in which a RTSP parameter is set. Also, when sending and receiving media information used for streaming using an RTSP message, the RTSP message contains a message-body.

Here, the RTSP message will be described. The request sent by the user terminal UE1 to the cache server 3 as an RTSP server, may be DESCRIBE, SETUP, PLAY, PAUSE, or TEARDOWN. DESCRIBE is used to allow the user terminal UE1 to acquire information about the content from the cache server 3. SETUP sets the transport parameters used when sending and receiving between the user terminal UE1 and the cache server 3. PLAY is used for playback start, or playback restart, of content. PAUSE is used to stop content playback. TEARDOWN is used to end content playback.

A Scale header and a Range header can be added to a PLAY request. If a Scale header is added to a PLAY request, it becomes a content playback request with a multiplier value specified by the Scale header. If a Range header is added to a PLAY request, the content is distributed within the range of playback positions specified by the Range header. The information that can be specified by the Range header is a playback starting position and a playback ending position in the content.

Next, the packet format containing a RTP packet will be described. The RTP packet is stored in the data part of UDP that is the transfer protocol. The header and data parts of UDP are stored in the payload which has an IPv6 packet format.

Next, the RTP packet format will be described. The RTP packet format includes a basic header, an extension header, and a payload. The basic header contains a session identifier. Multimedia data is stored in the payload.

Next, the packet format containing a HTTP (Hypertext Transfer Protocol) message will be described. An HTTP message is stored in the data part of the transfer protocol, such as TCP. The header and data parts of the transfer protocol are stored in the payload which has an IPv6 packet format.

Next, the format of the HTTP message will be described. The HTTP message contains at least a start-line that shows a request or an ACK, and a header field in which HTTP parameters are set. When sending and receiving information in a HTML (Hypertext Markup Language) document using a HTTP message, the HTTP message contains a message-body.

Referring to the sequence shown in FIG. 16, the procedure whereby the terminal location DB5 acquires correspondence information about the user terminal UE1 and the edge node 2 that connects the user terminal UE1 will now be described.

The user terminal UE1, when connecting with the edge node 2, sends a network connection request to the edge node 2 (101). The edge node 2 sends the network connection request received from the user terminal UE1 to the NACF4 (102). The NACF4, when it receives the network connection request, performs network connection authentication/approval of the user terminal UE1, and if authentication is successful, it assigns an IP address to the user terminal UE1 (103). The NACF4 then sends an ACK to the network connection request, to the edge node 2 (104). The edge node 2 sends the ACK received from the NACF4 to the user terminal UE1 (105).

The NACF4 sends the NAI (Network Access Identifier) of the user terminal UE1, the IP address of the user terminal UE1, and a user connection notification containing the IP address of the edge node 2 (106), to the PNA6. The PNA6 sends an ACK to the user connection notification, to the NACF4 (107). The PNA6 holds correspondence information about the NAI of the user terminal UE1 and the SIP_URI (Uniform Resource Identifier) of the user terminal UE1, and changes the received NAI into a SIP_URI (108). The PNA6 sends the SIP_URI of the user terminal UE1, the IP address of the user terminal UE1, and the connection notification containing the IP address of the edge node 2, to the terminal location DB5 (109). The Publish method of SIP is used to send the user connection notification 109, for example. The terminal location DB5, when it receives the user connection notification from the PNA6 (110), sends an ACK to the user connection to the PNA6. The terminal location DB5 updates the correspondence information about the user terminal UE1 and the edge node 2 to which the user terminal UE1 is connected.

Due to the above method, the terminal location DB5 manages the correspondence information about the user terminal UE1 and the edge node 2 to which the user terminal UE1 is connected.

Next, referring to the sequence shown in FIG. 17, the criteria setting routine 54 of the original content server 9 and the setup steps of the resume intention criteria performed by the cache control server 8, will be described. In the following description, it is assumed that the address of the cache control server 8 is preset in the original content server 9.

Figure 17:
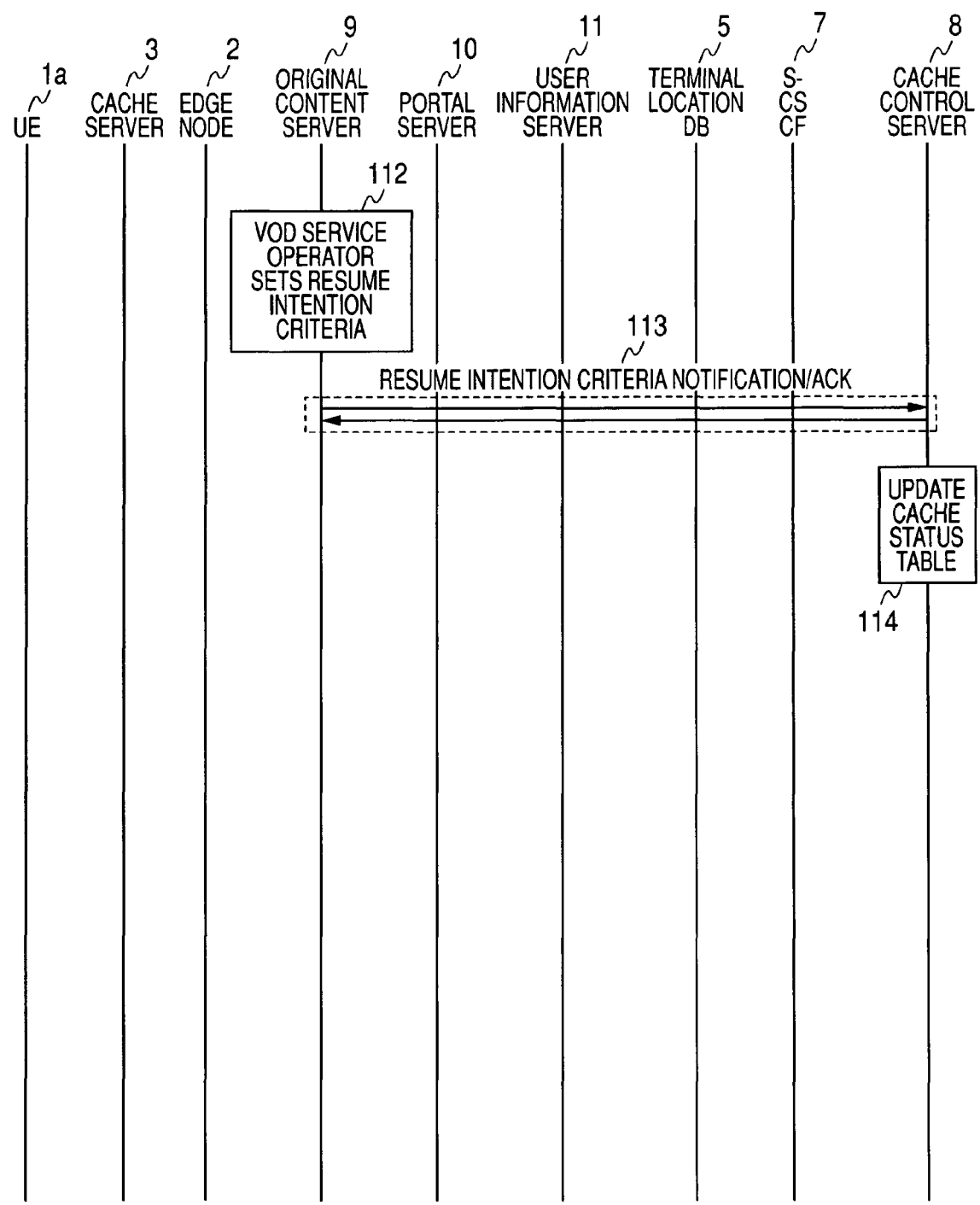
FIG. 17 is a sequence diagram of the first embodiment, showing an example of a setting of a resume intention criteria.

In FIG. 17, the administrator of the VOD_ISP network N2 first sets the resume intention criteria as the original content of the original content server 9 (112). Due to this operation, the resume intention criteria setting routine 54 in the original content server 9 is started.

FIG. 12 shows the steps of the resume intention criteria setting routine 54. In FIG. 12, first, the resume intention criteria setting routine 54 is started by the administrator (in the figure, VOD service operator) of the VOD_ISP network N2 (513). The original content server 9 has an input device and a display to receive an input from an administrator. A content ID input column and an Exit button are displayed on the display, and the system waits for input from the administrator of the VOD_ISP network N2 (500). If the Exit button is pushed, the resume intention criteria setting routine 54 is terminated (507).

When a content ID is inputted, the content management table 56 is searched using the inputted content ID as a key (501) If, as a result of search, a suitable ID does not exist in the content management table 56 the routine returns to the step 500 (505). At this time, a message to the effect that the inputted content ID is not suitable, may be displayed.

On the other hand, as a result of referring to the step 501, if there is a suitable ID in the content management table 56, the input column of the stop position range and the Exit button are displayed on the display, and the system waits for input from the administrator of the VOD_ISP network N2 (502). If the Exit button is pushed, the resume intention criteria setting routine 54 is terminated (509).

When the stop position range is inputted, the suitability of the input content is checked based on the sum total playback time 423 stored in the content management table 56. If, as a result of the check, it is determined that it is not suitable, the routine returns to the step 502 (511).

On the other hand, if as a result of the check, it is determined that the inputted stop position range is suitable, the resume intention criteria 422 stored in the content management table 56 is updated. Also, the content ID 420, the data size 424, and the resume intention criteria 422 are sent to the cache control server 8 (504, step 113 of FIG. 17), and processing by the original content server 9 is terminated.

When the original content server 9 sends the content ID 420 and the resume intention criteria 422 to the cache control server 8, HTTP is used. However, as long as it is a method whereby an effect equivalent to that of the present invention is obtained, a protocol other than HTTP, e.g., SIP, may be used.

When the original content server 9 sends the content ID 420 and the resume intention criteria 422 to the cache control server 8, the information goes through the gateway unit 71 and the gateway unit 70. Hereafter, it will be assumed that when communicating between the nodes (the portal server 10, the user information server 11, the original content server 9) that constitute the VOD_ISP network 2, and the nodes (cache control server 8, cache server 3, and edge node 2). that constitute the core network N1, the information goes through the gateway unit 70 and the gateway unit 71, although this is omitted from the drawings and the description. It will also be assumed that the gateway unit 70 and the gateway unit 71 do not perform processing of HTTP, SIP, and RTSP protocols.

Due to the above procedure, the cache control server 8 can acquire the resume intention criteria set by the administrator of the VOD_ISP network N2 for each content. As a result, the cache control server 8 can determine the user's resume intention based on the resume intention criteria set by the administrator of the VOD_ISP network N2.

Returning now to FIG. 17, the cache control server 8, when it receives a resume intention criteria notification 113 from the original content server 9, sends an ACK to the original content server 9. Next, a resume intention criteria receiving routine 26 in the cache control server 8 is started, and the cache status table 29 in the cache control server 8 is updated (114).

FIG. 9 shows the steps of the resume intention criteria receiving routine 26 performed by the cache control server 8. In FIG. 9, first, the resume intention criteria receiving routine 26 receives the resume intention criteria notification from the original content server 9 (514). The cache status table 29 is then searched for the content ID contained in an incoming message as a key (515). If, as a result of search, there is a suitable content ID 400 in the cache status table 29, the resume intention criteria 40 stored in the cache status table 29 is overwritten by the criteria contained in the incoming message (516).

On the other hand, if as a result of search, there is no suitable content ID 400 in the cache status table 29, the cache status table 29 newly adds the content ID and the resume intention criteria contained in the incoming message (517). As a result, for example as in the entry 29-3 of FIG. 6, information is stored only for the content ID 400, the data size 405, and the resume intention criteria 401, and lines of empty data are added for the cache server ID 402, the viewing user ID 403, and the delete inhibit span 404.

Due to the above procedure, the cache control server 8 can reflect the resume intention criteria received from the original content server 9 in the cache status table 29. As a result, the cache control server 8 can determine the user's resume intention based on the resume intention criteria 401, and can use it to set the cache content delete inhibit span as described later.

Figure 19:
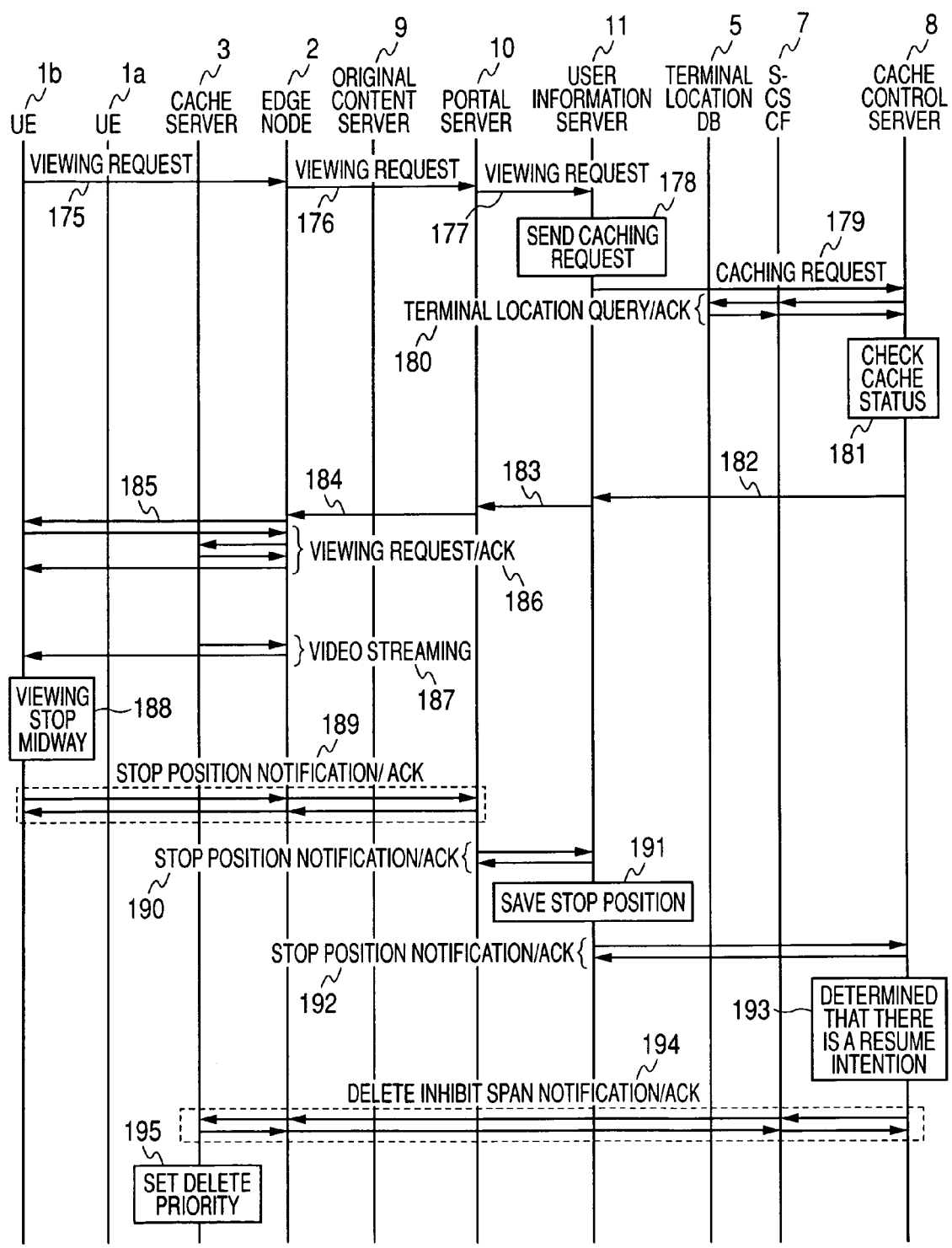
FIG. 19 is a sequence diagram of the first embodiment, showing another example of a caching, content distribution, resume intention evaluation, and delete priority setting.
Figure 20:
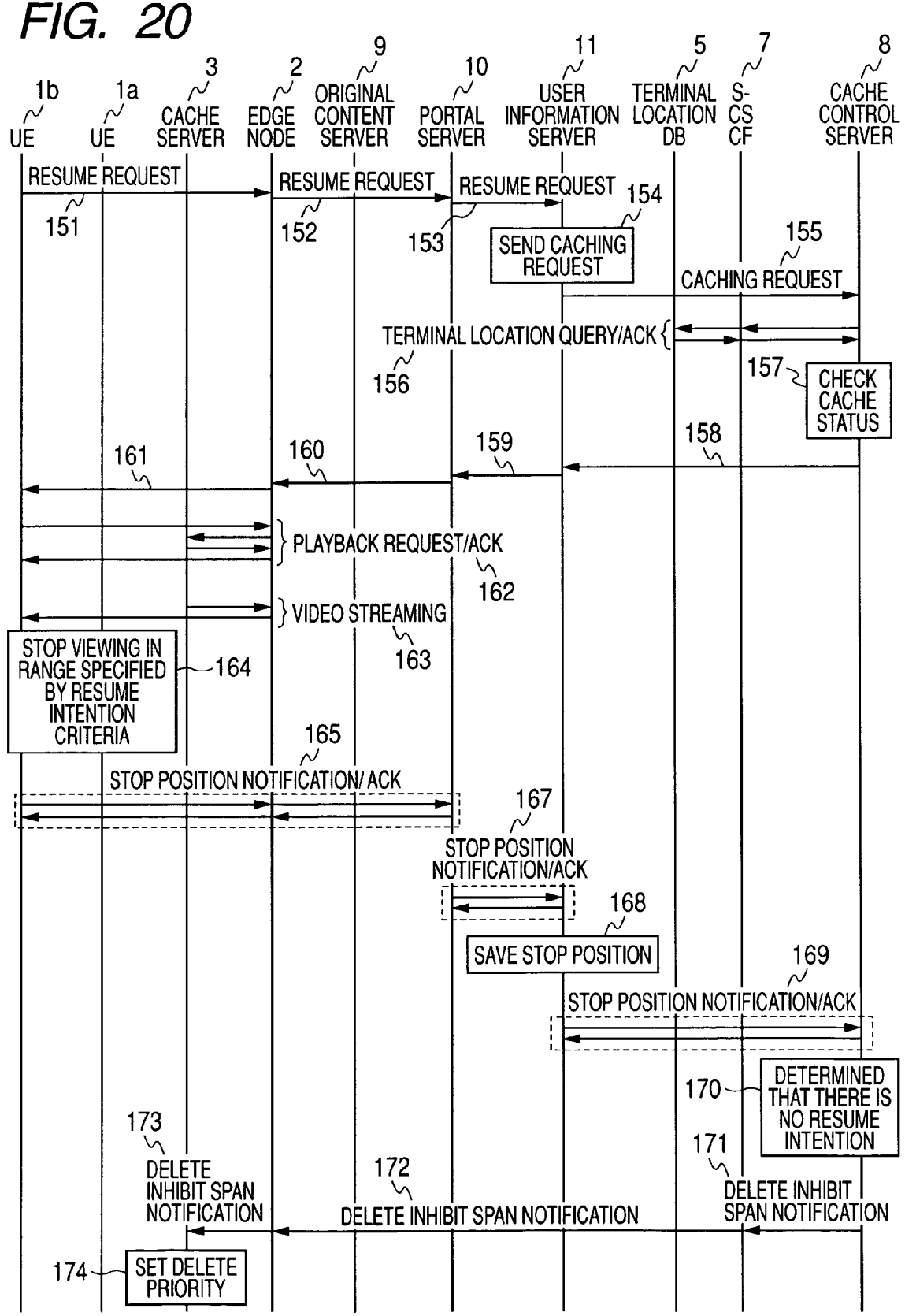
FIG. 20 is a sequence diagram of the first embodiment, showing a further example of a caching, content distribution, resume intention evaluation, and delete priority setting.

Next, referring to the sequences shown in FIG. 18, FIG. 19, and FIG. 20, the procedure whereby the cache control server 8 performs a resume intention evaluation and sets a delete inhibit span based on the content stop position, and the cache server 3 updates the delete priority list 44, will be described.

It is assumed that the address of the portal server 10 is set in the user terminal UE1 (1a, 1b). It is assumed that the address of the user information server 11 is set in the portal server 10. It is assumed that the address of the cache control server 8 is set in the user information server 11. It is assumed that the terminal location DB5 and the SIP_URI of the cache server 3 are set in the cache control server 8. It is assumed that the address of the original content server 9 and SIP_URI of the cache control server 8 are set in the cache server 3. HTTP is used for communication between the portal server 10 and the user information server 11.

Temporary Halt

Figure 18:
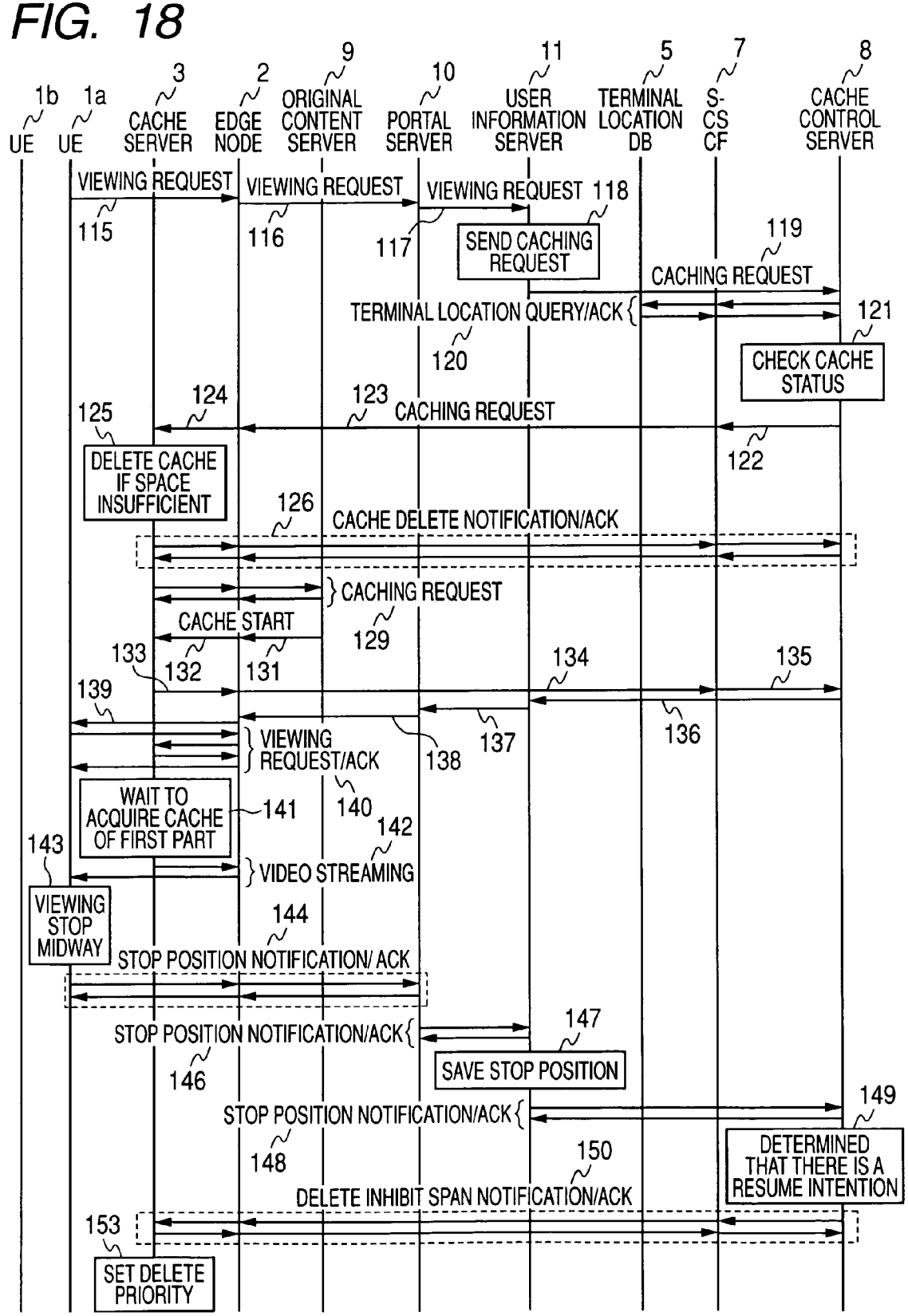
FIG. 18 is a sequence diagram of the first embodiment, showing a caching, content distribution, resume intention evaluation, and delete priority setting.

In FIG. 18, the user starts viewing by logging in to the service provided by the portal server 10 from the user terminal UE1, and pressing (or clicking) the play button or resume button of the content he wishes to view on the portal screen. When the user presses the play button of the content, first, the user terminal UE1a sends a viewing request to the portal server 10 via the edge node 2 (115, 116). The portal server 10 sends the viewing request of the user terminal UE1 received from the edge node 2 to the user information server 11 (117). The user information server 11 starts the caching request sending routine 66 (118).

Figure 14:
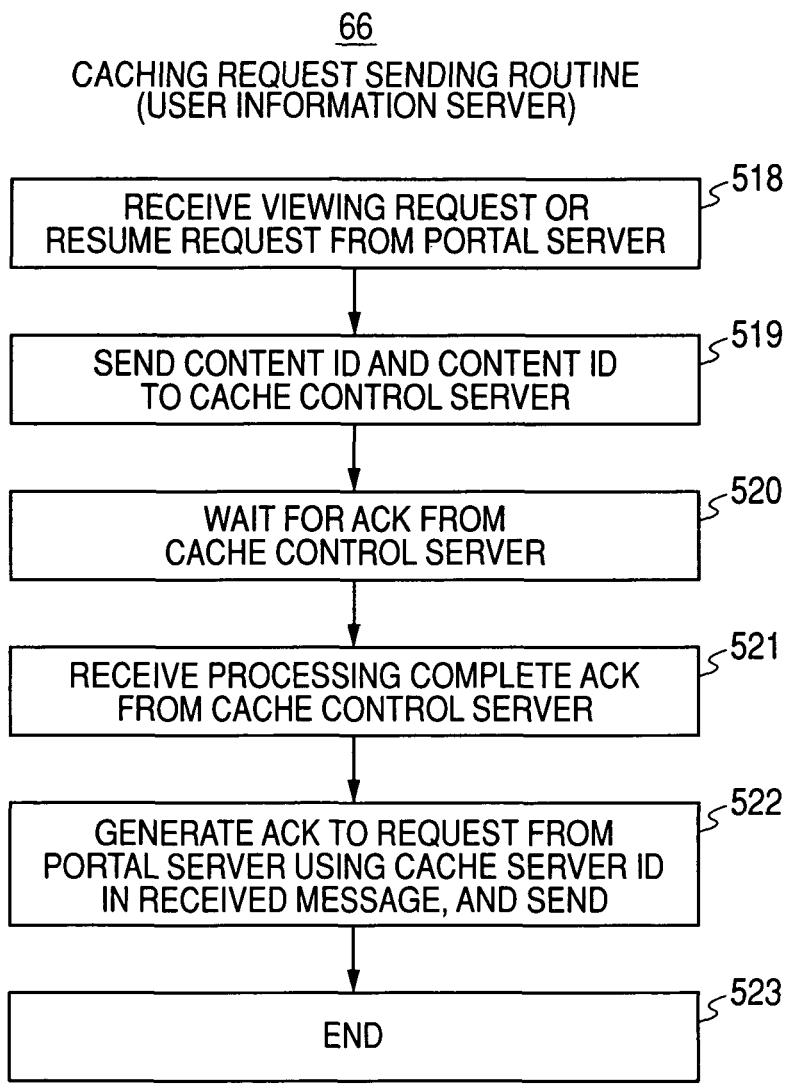
FIG. 14 is a flow chart of the first embodiment, showing an example of a caching request sending routine with which a message control function for a cache control server of a user information server is provided.

FIG. 14 shows the steps of the caching request sending routine 66. In FIG. 14, when the user information server 11 receives the viewing request from the user terminal UE1 via the portal server 10 (518), a user ID contained in the viewing request and a caching request message containing a content ID are generated, and sent to the cache control server 8 (519, 119) Also, in this embodiment, the SIP_URI is used as the user ID. The cache control server 8 controls the cache arrangement of the content based on the user ID and the content ID of the caching request message that was received. The user information server 11 then waits for an ACK from the cache control server 8 (520).

Returning now to FIG. 18, the cache control server 8, when it receives the caching request 119 from the user information server 11, queries the terminal location of the user terminal UE1 to DB5 via S-CSCF7 (120). SIP_Subscribe is used to query the terminal location. In the step 120, the cache control server 8 acquires correspondence information about the SIP_URI of the user terminal UE1a and the IP address of the edge node 2 from the terminal location DB5. When this information is acquired, in the cache control server 8, a caching request sending routine 24 is started (121). The steps of the caching request sending routine 24 when the processing of the step 121 is performed, but the cache server 3 matched with the user terminal UE1a does not have the requested content, will now be described.

FIG. 7 shows the steps of the caching request sending routine 24. In FIG. 7, the cache control server 8, when it receives the caching request from the user information server 11, acquires correspondence information about the SIP_URI of the user terminal UE1a and the IP address of the edge node 2 from the terminal location DB5 (524).

The cache control server 8 holds an (edge node, cache server) correspondence table 27, wherein correspondence information about the IP address of the edge node 2, the RTSP_URL of the cache server 3 used by the user terminal UE1a connected to the edge node 2, and the SIP_URI of the cache server 3, is set. The cache control server 8, using the correspondence information about the SIP_URI of the user terminal UE1a, the IP address of the edge node 2 acquired from the terminal location DB5, and the (edge node, cache server) correspondence table 27, acquires the IP address and the RTSP_URL of the cache server matched with the SIP_URI of the user terminal UE1a (525).

Next, using the content ID and the RTSP_URL of the cache server 3, the cache status table 29 is searched to check whether the user's requested content has been saved by the corresponding cache server 3 (526).

When the corresponding cache server 3 has not saved the user's requested content, correspondence information about the content ID, the RTSP_URL of the cache server 3, and the user's SIP_URI, is added to the cache status table 29 (529). By adding the content ID, the RTSP_URL of the cache server 3 and the user's SIP_URI to the cache status table 29, the cache control server 8 can manage the correspondence between the cache server that will save the content and the user.

The cache control server 8 sends a caching request for suitable content to the cache server 3 using SIP, and enters an ACK receive wait state (530). The caching request message contains the content ID 400 and the data size 405 of the content.

Returning to FIG. 18, when the cache server 3 receives the caching request (122, 123, 124) from the cache control server 8, it checks whether there is sufficient space to save the new content based on the data size contained in the caching request. If there is insufficient space, the cache server 3 deletes the cache content according to the delete priority list 44 (125). The cache content delete procedure where the cache server 3 holds the delete priority list 44 shown in FIG. 10a, will now be described. The cache server 3 deletes the content "Content 6" with the highest delete priority on the delete priority list 44, and deletes the entry 44-7. Also, the pointer of the entry 44-6 with the second highest delete priority is overwritten by "Head". As a result, the delete priority list 44 held by the cache server 3 is as shown in FIG. 10b. Specifically, the cache server 3 sets the delete priority higher, the closer the delete inhibit span is to the present time, or the higher the delete priority (ranking of content due to be deleted) is. The cache server 3 deletes the content in the cache server 3 in the order of the highest delete priority, and when sufficient space to store new content becomes available, it sends a cache delete notification to the cache control server 8 using SIP (126). The cache control server 8 then sends an ACK to the cache server 3.

On the other hand, if there is sufficient space to save the new content, steps 125 and 126 are omitted.

The cache server 3 sends the caching request to the original content server 9 using HTTP (129). The original content server 9 sends an ACK to the cache server 3, and starts sending the content (131, 132). The cache server 3 sends the ACK to the caching request to the cache control server 8, without waiting for acquisition of the content to terminate (133, 134, 135).

Returning to FIG. 7, the caching request sending routine 24 of the cache control server 8 that was waiting for an ACK from the cache server 3 in the step 530 generates an ACK in response to the caching request (119) from the user information server 11 (531). This ACK contains the RTSP_URL of the cache server 3 acquired in the step 525. Since the ACK contains the RTSP_URL of the cache server 3, the user information server 11 can send the RTSP_URL of the cache server 3 matched with the user terminal UE1a to the portal server 10. The cache control server 8 sends an ACK to the user information server 11 (136), and terminates processing (532).

Returning to FIG. 14, the caching request sending routine 66 that was waiting for an ACK from the cache control server 8 in the step 520, when it receives an ACK 136 from the cache control server 8 (521), generates an ACK to the viewing request from the portal server 10 (522). The RTSP_URL of the cache server 3 contained in the ACK received from the cache control server 8 is added to the ACK to the viewing request from the portal server 10. Since the ACK contains the RTSP_URL of the cache server 3, the portal server 10 can send the RTSP_URL of the cache server 3 matched with the user terminal UE1a to the user terminal UE1a. The user information server 11 sends an ACK to the viewing request to the portal server 10 (137), and terminates processing (523).

Returning to FIG. 18, the portal server 10, when an ACK to a viewing request is received from the user information server 11 (137), generates an ACK to the viewing request, to the user terminal UE1a. Information required for the user to receive content from the cache server 3, such as the RTSP_URL of the cache server 3 contained in the ACK received from the user information server 11, is added to the ACK to the viewing request from the user terminal UE1a. The portal server 10 sends the ACK to the viewing request from the user terminal UE1a, to the user terminal UE1a via the edge node 2 (138, 139).

The user terminal UE1a, using the RTSP_URL of the cache server 3 received from the portal server 10, sends a viewing request to the cache server 3 via the edge node 2, and receives an ACK from the cache server 3 (140). RTSP is used for the viewing request that the user terminal UE1a sends to the cache server 3.

The cache server 3, if acquisition of the content for a fixed time period (e.g., several minutes) from the original content server 9 in the steps 131 and 132 has not been completed, starts content distribution to the user terminal UE1a (142) after waiting for completion (141). On the other hand, if acquisition of the content for a fixed time period (e.g., several minutes) has already been performed, content distribution to the user terminal UE1a is started (142) without performing the step 141. Caching of that part of the same content which has not been completely acquired is performed in the background simultaneously with content distribution. RTP is used for distribution of the content (142).

When the user stops viewing the content, he sends a stop position notification to the portal server 10 via the edge node 2 from the user terminal UE1a (143, 144). This stop position notification is sent using HTTP regardless of the stop position. The portal server 10, when it receives the stop position notification from the user terminal UE1a via the edge node 2, sends an ACK to the user terminal UE1a. Next, the portal server 10 sends the stop position notification including the SIP_URI of the user terminal UE1a, content ID, and stop position information to the user information server 11 (146). Next, the user information server 11 sends an ACK to the portal server 10, and starts the stop position sending routine 67.

Figure 15:
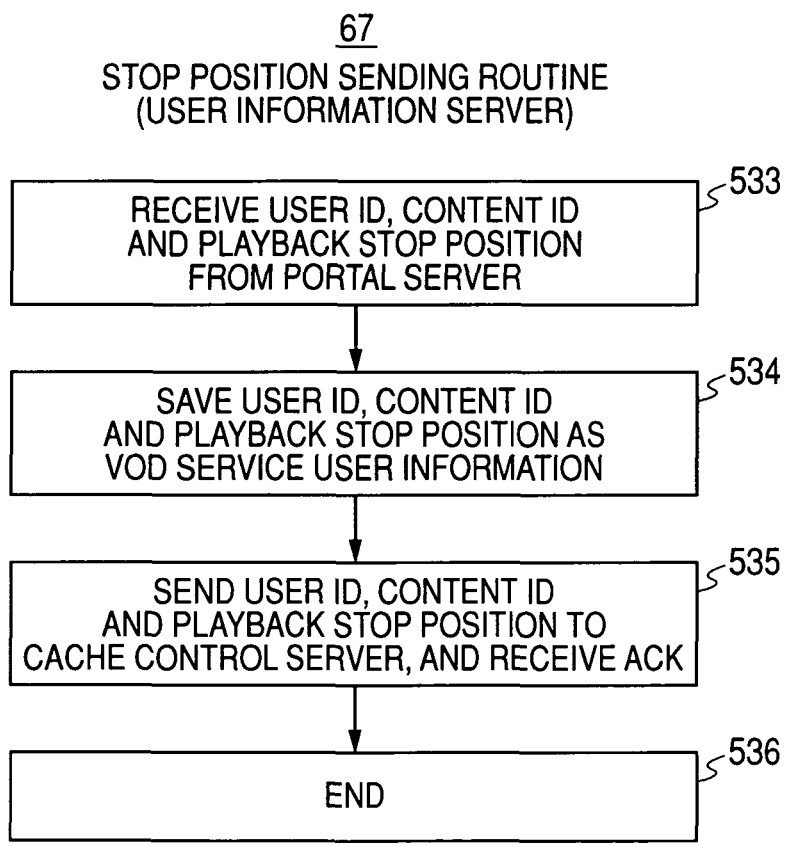
FIG. 15 is a flowchart of a first embodiment, showing an example of a stop position sending routine with which a message control function for a cache control server of a user information server, is provided.

FIG. 15 shows the steps of the stop position sending routine 67 performed by the user information server 11. In FIG. 15, the user information server 11 receives the stop position notification including the SIP_URI, content ID, and stop position information about the user terminal UE1a from the portal server 10 (533). Correspondence information about the SIP_URI of the user terminal UE1a, the content ID, and the stop position are stored in the VOD service user information 68 (534, 147). Also, the user information server 11 sends the stop position notification including the SIP_URI of the user terminal UE1a, content ID, and stop position information to the cache control server 8 by HTTP (535, 148), receives an ACK, and terminates processing (536). By having the user information server 11 send the stop position notification 148 to the cache control server 8, the cache control server 8 can determine the user's resume intention based on the viewing stop position.

Returning to FIG. 18, the cache control server 8, when it receives the stop position notification 148 from the user information server 11, sends an ACK to the user information server 11. Next, the resume intention evaluation routine 25 starts and it is determined whether the user has a resume intention (149).

Figure 8:
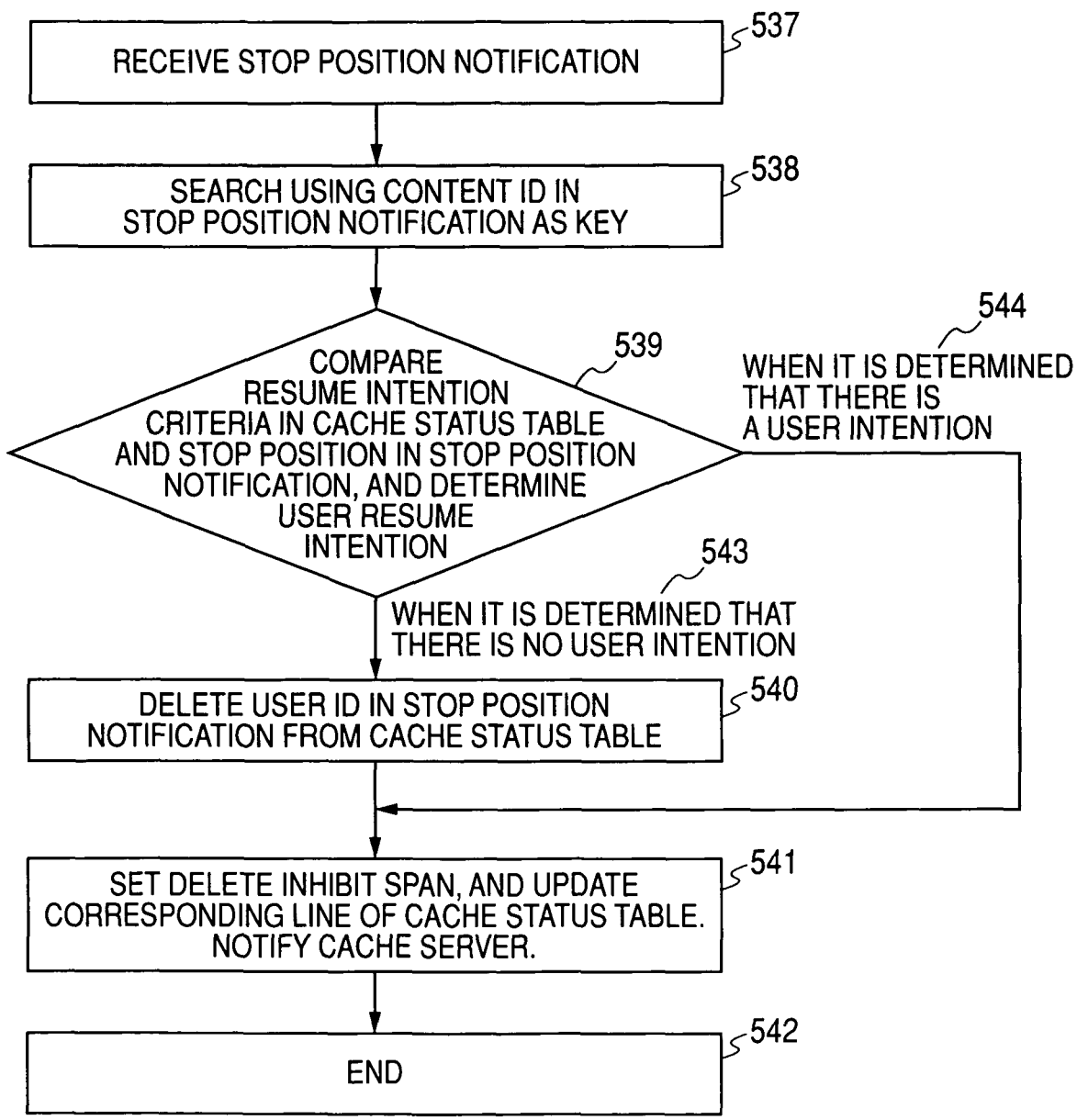
FIG. 8 is a flow chart of the first embodiment, showing an example of a resume intention evaluation routine.

The steps of the resume intention evaluation routine 25 will now be described for the case where the viewing stop position is outside the range specified by the resume intention criteria 401. FIG. 8 shows the steps of the resume intention evaluation routine 25. In FIG. 8, the cache control server 8 receives the stop position notification that includes the SIP_URI of the user terminal UE1a, content ID, and stop position information from the user information server 11 (537, 148). The cache control server 8 then searches the cache status table 29 for the content ID contained in the stop position notification 148 by a key.

The cache control server 8, as a result of search, determines a user's resume intention using the acquired resume intention criteria 401 and the stop position information in the stop position notification 148 received from the user information server 11 (539). The cache control server 8, when the stop position information in the stop position notification 148 is not within the range specified in the resume intention criteria 401 (544), determines that there is a resume intention.

Next, a delete inhibit span is set considering the user's resume intention, and the delete inhibit span 404 of the cache status table 29 is updated (541). The cache control server 8 also generates a delete inhibit span notification containing the content ID 400 and the delete inhibit span 404, sends them to the cache server 3, and terminates processing (542). When the cache control server 8 sends the delete inhibit span notification to the cache server 3, SIP Notify is used. By having the cache control server 8 send the delete inhibit span notification to the cache server 3, the cache server 3 causes the delete inhibit span set by the cache control server 8, which is based on the user's resume intention, to be reflected in the delete priority list 44.

Returning to FIG. 18, the cache control server 8 sends the delete inhibit span notification to the cache server 3 via S-CSCF7 and the edge node 2 by SIP_Notify (150). The cache server 3, when it receives the delete inhibit span notification, sends an ACK to the cache control server 8. The cache server 3 also starts the delete inhibit span receiving routine 41, and updates the delete priority list 44 (153).

FIG. 11 shows the steps of the delete inhibit span receiving routine 41 performed by the cache server 3. In FIG. 11, the cache server 3 receives the delete inhibit span notification from the cache control server 8 by SIP_Notify (545). Next, the delete priority list 44 is searched for the content ID 400 contained in the delete inhibit span notification that was received by a key (546). If as a result of search, there was no suitable content ID (552), the cache server 3 adds an entry for suitable content to the delete priority list 44 based on the delete inhibit span notification received from the cache control server 8 (549).

The addition procedure for new entries will now be described when the cache server 3 holds the delete priority list 44 shown in FIG. 10b. For example, when an entry is to be added for Content 8 for which the delete inhibit span 411 is 11:00 on 1 Jan. 2007, as shown in FIG. 10c, an entry 44-8 is added for which the content ID 410 is Content 8, the delete inhibit span 411 is 11:00 on 1 Jan. 2007, and the pointer 412 is Content 4. Further, the pointer 412 of entry 44-4 is overwritten by Content 8. As a result, the delete priority list held by the cache server 3 is as shown in FIG. 10c.

By having the cache server 3 reconstruct the delete priority list 44 based on the delete inhibit span notification received from the cache control server 8, the delete inhibit span set by the cache control server 8 can be reflected in the cache content delete priority. Therefore, when the user has a resume intention, the cache content can be saved preferentially to the cache server 3 until the user performs resume playback.

The procedure where content already acquired by the cache server 3 by the sequence of FIG. 18, is to be viewed on a user terminal UE1b different from the user terminal UE1a, will now be described referring to the sequence of FIG. 19. In FIG. 19, it is assumed that both the user terminal UE1a and user terminal UE1b are connected to the edge node 2, and are matched with the same cache server 3 at the terminal location DB5.

The user terminal UE1b sends a viewing request to the portal server 10 (175). The procedure until the cache control server 8 acquires correspondence information about the SIP_URI of the user terminal UE1b and the IP address of the edge node 2 from the terminal location DB5 (180), is the same as replacing the user terminal UE1a by the user terminal UE1b in the procedure from the steps 115-120 of FIG. 18.

Next, the cache control server 8 starts the caching request sending routine 24 (181). The steps of the caching request sending routine 24 will be described for the case where the cache server 3 matched with the user terminal UE1b has stored the requested content.

FIG. 7 shows the steps of the caching request sending routine 24. The cache control server 8, when a caching request is received from the user information server 11, acquires correspondence information about the SIP_URI of the user terminal UE1b and the IP address of the edge node 2 from the terminal location DB5 (524).

The cache control server 8 holds the (edge node, cache server) correspondence table 27, wherein correspondence information about the IP address of the edge node 2, the RTSP_URL of the cache server 3 used by the user terminal UE1b connected to the edge node 2, and the SIP_URI of the cache server 3, is set. The cache control server 8, using the correspondence between the SIP_URI of the user terminal UE1b, the IP address of the edge node 2 acquired from the terminal location DB5, and the (edgenode, cache server) correspondence table 27, acquires the IP address and RTSP_URL of the cache server matched with the SIP_URI of the user terminal UE1b (525).

Next, the cache status table 29 is searched using the content ID and the RTSP_URL of the cache server 3, and it is checked whether the user's requested content has been saved by the cache server 3 matched with the user terminal UE1b (526).

When the cache server 3 matched with the user terminal UE1b has stored the user's requested content, the viewing user ID 403 for the requested content saved by the cache server 3 matched with the user terminal UE1b of the cache status table 29, is looked up.

It is checked whether the SIP_URI of the user terminal UE1b contained in the caching request received from the user information server 11 has been stored (527).

When the SIP_URI of user terminal UE1b has not been stored, the SIP_URI of the user terminal UE1b is added to the cache status table 29 (528). Next, an ACK to the caching request from the user information server 11 is generated. The ACK contains the RTSP_URL of the cache server 3 acquired in the step 525. The cache control server 8 sends the ACK to the user information server 11 (182), and terminates processing (532).

Also when, in the step 527, the SIP_URI of the user terminal UE1b has been stored, an ACK to the caching request from the user information server 11 is generated. The ACK contains the RTSP_URL of the cache server 3 acquired in the step 525. The cache control server 8 sends the ACK to the user information server 11 (182), and terminates processing (532).

Returning to FIG. 19, the cache control server 8 sends an ACK to the user information server 11 (182). The procedure until the user terminal UE1b receives an image stream (187) is the same as the procedure from steps 136-142 of FIG. 18, except that the user terminal UE1a is replaced by the user terminal UE1b, and the step (141) that waits for acquisition for a fixed period of content (e.g., several minutes) is omitted.

After the user stops viewing the content (188), the procedure until the cache control server 8 receives the notification of the stop position from the user information server 11 (192) is the same as that from the steps 143-148 of FIG. 18, wherein the user terminal UE1a is replaced by the user terminal UE1b.

The cache control server 8 then starts the resume intention evaluation routine 25 in a step 193. If the cache control server 8 determines that the user of the user terminal UE1b has a resume intention, the delete inhibit span 411 is extended (step 541 of FIG. 8).

Next, the cache control server 8 sends a delete inhibit span notification to the cache server 3 (194). The cache server 3, when it receives the delete inhibit span notification 194 from the cache control server 8, starts the delete inhibit span receiving routine 41 (195).

The cache server 3 receives the delete inhibit span notification from the cache control server 8 by SIP_Notify (545). Next, the delete priority list 44 is searched for the content ID 400 in the delete inhibit span notification that was received by a key (546). If there is a suitable content match as a result of search (551), the delete inhibit span 411 of the suitable content 410 stored in the delete priority list 44 is updated with the value in the delete inhibit span notification that was received (547). Also, the pointer of the delete priority list 44 is updated based on the updated delete inhibit span 411 (548).

The updating procedure for the delete priority list 44 when the cache server 3 holds the delete priority list 44 shown in FIG. 10c, will now be described. For example, when extending the delete inhibit span 411 of Content 8 from 11:00 on 1 Jan. 2007 to 21:00 on 3 Jan. 2007, the pointer 412 belonging to the entry 44-8 of Content 8 is updated from Content 4 to Content 3. Also, the pointer 412 of the entry 44-4 is updated from Content 8 to Content 4, and the pointer 412 of the entry 44-2 is updated from Content 3 to Content 8. As a result, the delete priority list 44 held by the cache server 3 is as shown in FIG. 10d.

When the cache server 3 reconstructs the delete priority list 44 based on the delete inhibit span notification received from the cache control server 8, the delete inhibit span set by the cache control server 8 is reflected in the cache content delete priority. Therefore, when the user has a resume intention, the delete inhibit span can be extended and the cache content can be saved preferentially to the cache server 3.

Next, the procedure whereby the user performs resume playback based on the position where playback stopped in the steps 142 and 143 of FIG. 18, and the stop occurs within the range specified by the resume intention criteria 401, will be described referring to the sequence of FIG. 20. In FIG. 20, when the user performs resume playback, the requested content is saved by the cache server 3.

A user logs in to the service provided by the portal server 10 from the user terminal UE1*b*, and performs resume playback by pressing the resume button of the content he wishes to view on the portal screen. When the user performs resume, first, the user terminal UE1*b* sends a resume request to the portal server 10 via the edge node 2 (151, 152). The portal server 10 sends the resume request that was received to the user information server 11 (153). The user information server 11 starts the caching request sending routine 66 (154).

FIG. 14 shows the steps of the caching request sending routine 66. In FIG. 14, when the user information server 11 receives the resume request from the portal server 10 (518), the user ID in the viewing request and a caching request message containing a content ID are generated, and sent to the cache control server 8 (519 and 155 of FIG. 20). The SIP_URI is used as the user ID. The cache control server 8 can select the cache server according to the user's location based on the user ID and content ID. The user information server 11 then waits for an ACK from the cache control server 8 (520).

Returning to FIG. 20, the cache control server 8, when it receives the caching request 155 from the user information server 11 (156), queries the terminal location to the terminal location DB5 via S-CSCF7. SIP-Subscribe is used to query the terminal location. In the step 156, the cache control server 8 acquires the correspondence between the SIP_URI of the user terminal UE1*b* and the IP address of the edge node 2 from the terminal location DB5. Here, the cache control server 8 starts the caching request sending routine 24 (157). The steps of the caching request sending routine 24 when the processing of the step 157 is performed, and the cache server 3 matched with the user terminal UE1*b* stores the requested content, will now be described.

FIG. 7 shows the steps of the caching request sending routine 24. In FIG. 7, the cache control server 8, when it receives a caching request from the user information server 11, acquires correspondence information about the SIP_URI of the user terminal UE1*b* and the IP address of the edge node 2 from the terminal location DB5 (524).

The cache control server 8 prestores the (edge node, cache server) correspondence table 27, wherein correspondence information about the IP address of the edge node 2, the RTSP_URL of the cache server 3 used by the user terminal UE1*b* connected to the edge node 2, and the SIP_URI of the cache server 3, is set. The cache control server 8, using the correspondence between the SIP_URI of the user terminal UE1*b* and the IP address of the edge node 2 acquired from the terminal location DB5, and the (edge node, cache server) correspondence table 27, acquires the IP address and RTSP_URL of the cache server matched with the SIP_URI of the user terminal UE1*b* (525).

Next, using the content ID and the RTSP_URL of the cache server 3, the cache status table 29 is searched, and it is checked whether the user's requested content has been saved by the cache server 3 matched with the user terminal UE1*b* (526).

If the cache server 3 matched with the user terminal UE1*b* has stored the user's requested content, the viewing user ID 403 of the requested content stored by the cache server 3 matched with the user terminal UE1*b* in the cache status table 29 is looked up. It is checked whether the SIP_URI of the user terminal UE1*b* in the caching request received from the user information server 11 has been stored (527).

If the SIP_URI of the user terminal UE1*b* has not been stored, the SIP_URI of the user terminal UE1*b* is added to the cache status table 29 (528). Next, an ACK to the caching request from the user information server 11 is generated. The ACK contains the RTSP_URL of the cache server 3 acquired in the step 525. The cache control server 8 sends the ACK to the user information server 11 (158), and terminates processing (532). Also if, in the step 527, the SIP_URI of the user terminal UE1*b* has been stored, an ACK to the caching request from the user information server 11 is generated. The ACK contains the RTSP_URL of the cache server 3 acquired in the step 525. The cache control server 8 sends the ACK to the user information server 11 (158), and terminates processing (532).

Returning to FIG. 14, the caching request sending routine 66 that was waiting for an ACK from the cache control server 8 in the step 520, when the ACK 158 is received from the cache control server 8 (521), generates an ACK to the resume request from the portal server 10 (522). The RTSP_URL of the cache server 3 in the ACK received from the cache control server 8, the user terminal UE1*b* stored in the VOD service user information 68, and the stop position information matched with the requested content, are added to the ACK to the resume request from the portal server 10. The user information server 11 sends the ACK to the viewing request to the portal server 10 (159), and terminates processing (523).

Returning to FIG. 20, the portal server 10, when the ACK to the resume request from the user information server 11 is received, generates an ACK to the resume request from the user terminal UE1*b* (159). Information such as the RTSP_URL of the cache server 3 in the ACK received from the user information server 11, and stop position information, etc., required for the user to resume playback of the content, is added to the ACK to the resume request from the user terminal UE1*b*. The portal server 10 sends the ACK to the viewing request from the user terminal UE1*b*, to the user terminal UE1*b* (160, 161).

The user terminal UE1*b*, using the RTSP_URL and stop position information of the cache server 3 received from the portal server 10, sends a playback request to the cache server 3, and receives an ACK from the cache server 3 (162). The RTSP is used for the playback request that the user terminal UE1*b* sends to the cache server 3. The cache server 3, when a playback request is received from the user terminal UE1*b*, performs streaming by RTP (163).

When the user stops viewing the content, the user terminal UE1*b* sends a stop position notification to the portal server 10, and receives an ACK from the portal server 10 (165). This stop position notification is sent using HTTP. The portal server 10, when it receives the stop position notification 165 from the user terminal UE1*b*, sends an ACK to the user terminal UE1*b*. Next, the portal server 10 sends the SIP_URI of the user terminal UE1*b*, content ID, and stop position notification containing stop position information to the user information server 11, and receives an ACK from the user information server 11 (167). Next, the user information server 1 starts the stop position sending routine 67.

Correspondence information about the SIP_URI of the user terminal UE1*b*, content ID, and the stop position, are stored in the VOD service user information 68 (168). Also, the user information server 11 sends the SIP_URI of the user terminal UE1*b*, content ID, and a stop position notification containing the stop position information to the cache control server 8 (169).

The cache control server 8, when the stop position notification 169 is received from the user information server 11, sends an ACK to the user information server 11. Next, the cache control server 8 starts the resume intention evaluation routine 25, and determines whether the user has a resume intention (170).

The steps of the resume intention evaluation routine 25 in the case where the viewing stop position is within the range specified by the resume intention criteria 401, will now be described. FIG. 8 shows the steps of the resume intention evaluation routine 25. In FIG. 8, the cache control server 8 receives the SIP_URI of the user terminal UE1*b*, content ID and stop position notification containing stop position information from the user information server 11 (537, 169). The cache status table 29 is then searched for the content ID contained in the stop position notification 169 by a key.

The cache control server 8 evaluates the user's resume intention using the resume intention criteria 401 acquired as a result of search, and the stop position information in the stop position notification 169 received from the user information server 11 (539). When the stop position information in the stop position notification 169 is within the range specified by the resume intention criteria 401, it is determined that there is no resume intention (543).

Next, a delete inhibit span is set considering the user's resume intention, and the delete inhibit span 404 of the cache status table 29 is updated (541). If the cache control server 8 determines that the user of the user terminal UE1*b* does not have a resume intention, the delete inhibit span 404 is shortened.

Also, a delete inhibit span notification containing the content ID 400 and the delete inhibit span 404 is sent to the cache server 3, and processing is terminated (542). When the cache control server 8 sends the delete inhibit span notification to the cache server 3, SIP_Notify is used.

Returning to FIG. 20, the cache control server 8 sends the delete inhibit span notification to the cache server 3 via S-CSCF7 by SIP_Notify (171, 172, 173). The cache server 3, when the delete inhibit span notification is received, starts the delete inhibit span receiving routine 41 (174).

The cache server 3 receives the delete inhibit span notification from the cache control server 8 by SIP_Notify (545). Next, the delete priority list 44 is searched for the content ID 400 contained in the delete inhibit span notification that was received by a key (546). If as a result of search, there is corresponding content (551), the delete inhibit span 411 of the corresponding content 410 stored in the delete priority list 44 is updated with the value in the delete inhibit span notification that was received (547). Also, the pointer of the delete priority list 44 is updated based on the updated delete inhibit span 411 (548).

The updating procedure for the delete priority list 44 when the cache server 3 holds the delete priority list of FIG. 10*d*, will now be described. For example, when the delete inhibit span 411 of Content 8 is shortened from 21:00 on 3 Jan. 2007 to 11:00 on 1 Jan. 2007, the pointer 412 belonging to the entry 44-8 of Content 8 is updated from Content 3 to Content 4. Also, the pointer 412 of the entry 44-2 is updated from Content 8 to Content 3, and the pointer 412 of the entry 44-4 is updated from Content 4 to Content 8. As a result, the delete priority list 44 held by the cache server 3 is as shown in FIG. 10*c*.

According to the first embodiment of the invention, when the user has a resume intention, the cache content is saved with priority to the cache server 3 until the user performs resume playback. Therefore, in the sequence of FIG. 20 wherein a user performs resume playback, the steps from step 122 of FIG. 18 to step 135 are omitted. As a result, the traffic from the original content server 9 to the cache server 3 in the steps 131 and 132 is reduced. The caching requests of the step 129 and the sending/receiving of ACKs are reduced. Also, since delete of content which the user interrupted viewing is inhibited, the waiting time when the user does resume playback is reduced.

Since the cache delete priority was set from the content stop position where the user finished playback based on the probability of viewing the corresponding content later, in a system that provides a streaming VOD service, the traffic of the core network N1 accompanying re-cache can be reduced, and the load of the original content server 9 can be reduced.

Second Embodiment

A second embodiment of the present invention will now be described referring to the drawings. In the second embodiment, the cache server 3 is provided with a means to count the normal speed playback time of the content, and send it to the cache control server 8. The normal speed playback time is the playback time at normal speed except for "trick play", such as fast forward and rewind.

Figure 21:
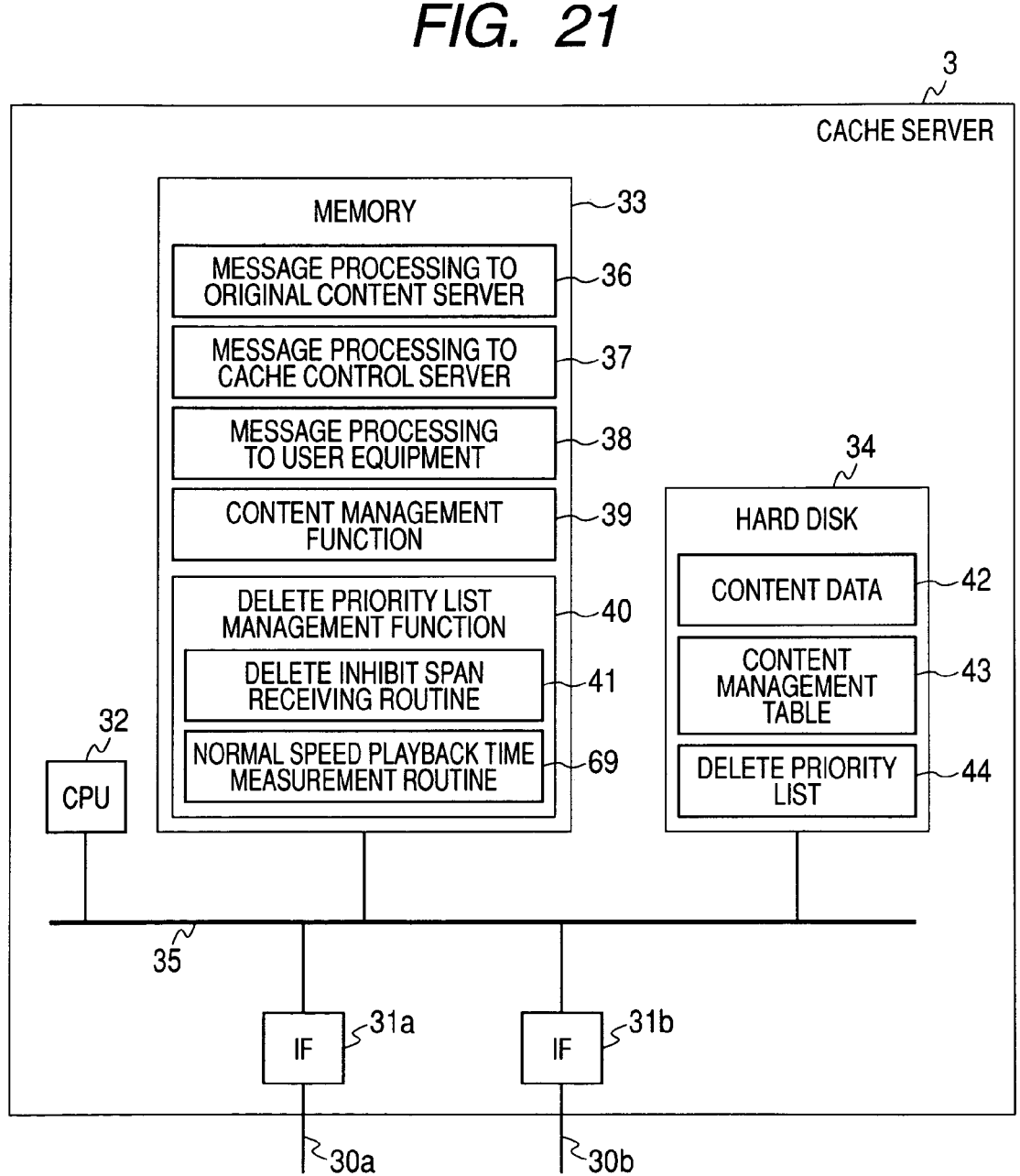
FIG. 21 is a block diagram showing a second embodiment, showing the construction of a cache server.

FIG. 21 shows an example of the components of the cache server 3 according to the second embodiment. In the second embodiment, the delete priority list maintenance function 40 is provided with a normal speed playback time measurement routine 69.

The normal speed playback time measurement routine 69 measures the playback time at normal speed except for "trick play", such as fast forward and rewind, and sends the measurement result to the cache control server 8. The cache control server 8, based on the normal speed playback time received from the cache server 3, can determine the user's resume intention.

FIG. 23 shows an example of the components of the cache status table 29 managed by the cache control server 8 according to the second embodiment. In the second embodiment, the resume intention criteria 430 is specified by the normal speed playback time instead of the stop position range. Since the resume intention criteria 430 is specified by the normal speed playback time, the cache control server 8 can determine the user's resume intention and set the delete inhibit span 434 based on the normal speed playback time.

Figure 16:
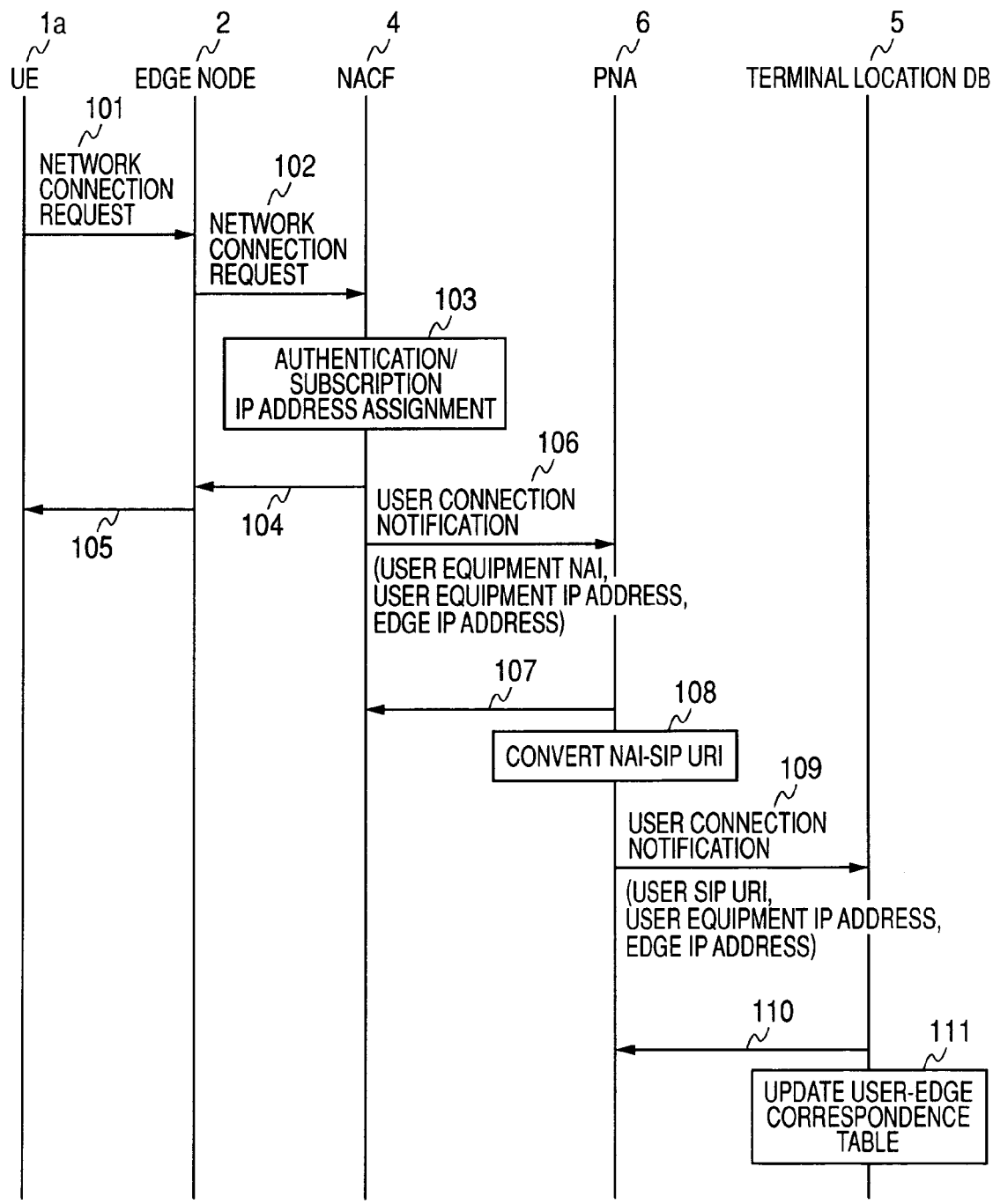
FIG. 16 is a sequence diagram of the first embodiment, showing the procedure of obtaining correspondence information about user terminal UE1 and the edge nodes to which user terminal UE1 are connected, performed by a terminal location DB.

The procedure whereby the terminal location DB 5 acquires correspondence information about the user terminal UE1*a* and the edge node 2 connected to the user terminal UE1*a*, is the same as that of the first embodiment (from step 101 of FIG. 16 to step 111). Also, the resume intention criteria setting procedure is the same as that of the first embodiment (from step 112 to step 114 of FIG. 17).

Figure 24:
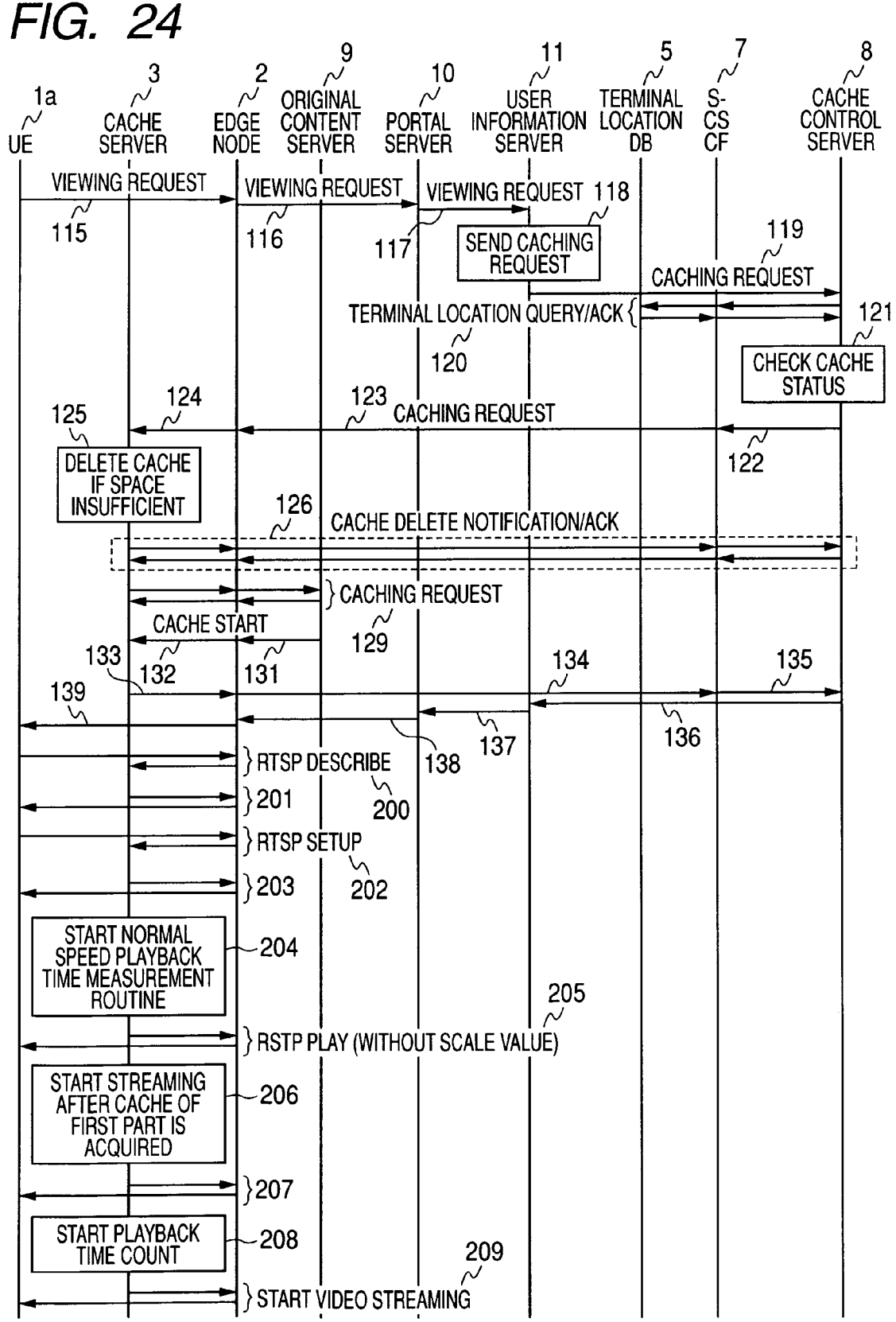
FIG. 24 is a sequence diagram of the second embodiment, showing a caching, content distribution, resume intention evaluation, and delete priority setting.

Next, the procedure whereby the cache control server 8 determines the cache resume intention and sets the delete inhibit span based on the normal speed playback time, and the cache server 3 updates the delete priority list 44, will be described according to the sequences of FIG. 24 and FIG. 25.

The procedure until the user terminal UE1*a* sends a viewing request to the portal server 10 and receives an ACK is the same as that of the first embodiment (from step 115 to step 139).

The user terminal UE1*a* sends a RTSP DESCRIBE to the cache server 3, based on information such as the RTSP_URL of the cache server 3 contained in the ACK 139 received from the original content server 9, and acquires information such as the media type of the content (200, 201). Next, the user terminal UE1*a* sends a RTSP SETUP to the cache server 3, and sets the transport parameters used between the user terminal UE1*a* and the cache server 3 (202, 203). The RTSP SETUP message 202 contains the IP address of the user terminal UE1*a* in the SDP (Session Description Protocol) or the destination address of the transport parameters. The cache server 3, when it receives the RTSP_SETUP 202, saves the IP address of the user terminal UE1*a*. The cache server 3 sets the saved IP address of the user terminal UE1*a* as the destination of the RTP packet during streaming. When the cache server 3 receives the RTSP SETUP 202 from the user terminal UE1a, the normal speed playback time measurement routine 69 is started (204).

FIG. 22 shows the steps of the normal speed playback time measurement routine 69.

In FIG. 22, the cache server 3 receives the RTSP SETUP from the user terminal UE1a, and when the transport parameters are set, it sends an ACK to the user terminal UE1a (553), and waits for a RTSP message (554).

Returning to FIG. 24, the user terminal UE1a sends a RTSP_PLAY that does not contain a Scale header to the cache server 3 (205). The Scale header of the RTSP_PLAY is not specified during normal speed playback, and is specified only during fast forward or rewind playback.

Returning to FIG. 22, when the cache server 3 receives the RTSP_PLAY (562, 205), it checks whether a Scale header is contained in the message (555). If a Scale value is not contained therein (565), it indicates normal speed playback, so counting of the playback time is started (556, 208), and video streaming is performed at normal speed (557, 209).

Figure 25:
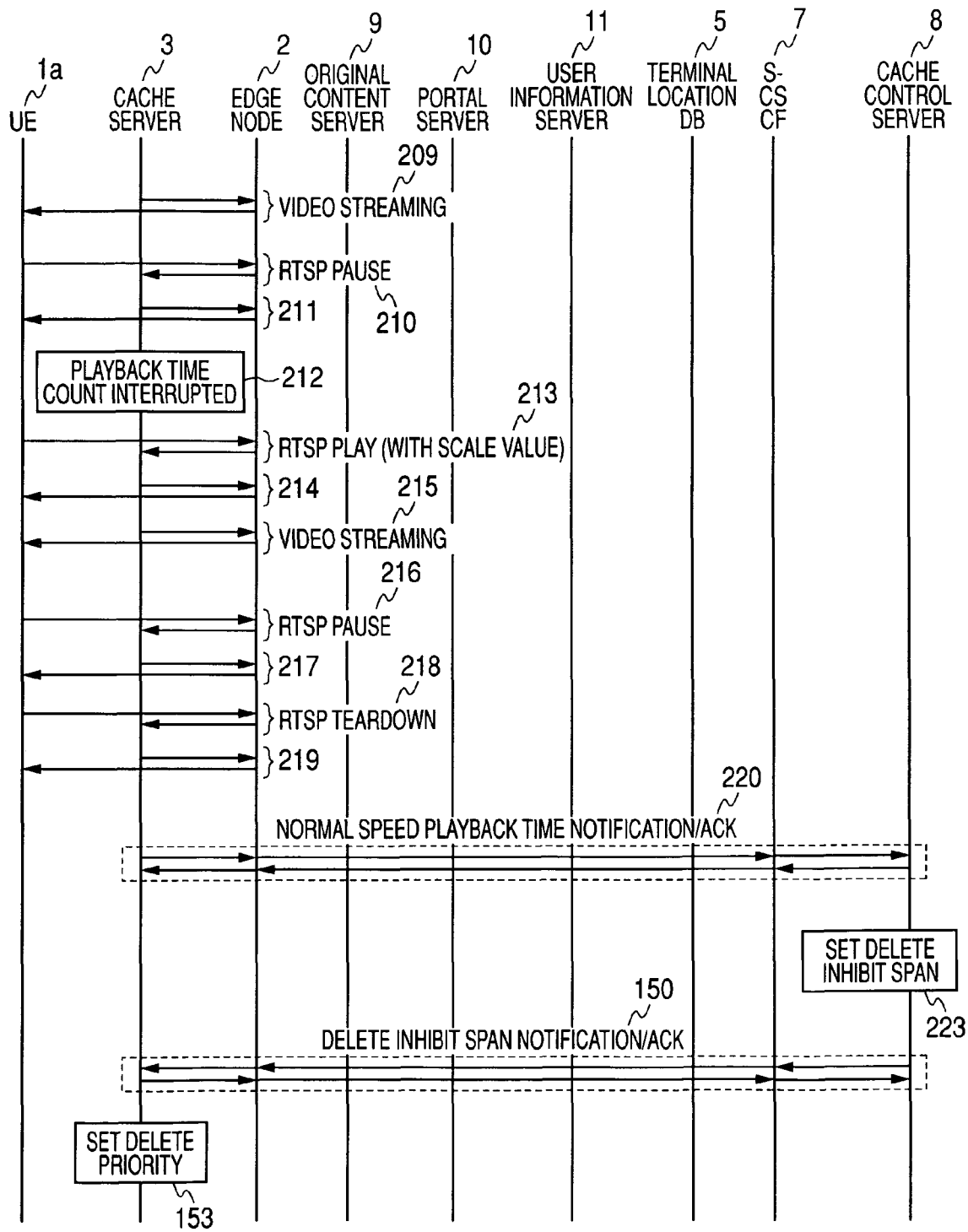
FIG. 25 is a sequence diagram of the second embodiment, showing another example of a caching, content distribution, resume intention evaluation, and delete priority setting.

Referring now to FIG. 25, when the playback speed changes over from normal speed to fast forward, the user terminal UE1a sends a RTSP_PAUSE to the cache server 3 (210, 211), and then sends a RTSP_PLAY that contains a Scale header (213, 214).

Returning to FIG. 22, the cache server 3, when it receives the RTSP_PAUSE (558, 210), checks whether the playback time is being counted (559), and if it is being counted (567), it interrupts the count (560, 212) and waits to receive a message (554). Next, when it receives the RTSP_PLAY (562, 213), it checks whether a Scale header is contained in the message (555), and if a Scale header is contained therein (564), it performs streaming to the user terminal UE1a without counting the playback time (557, 215).

Returning to FIG. 25, when content playback is stopped, the user terminal UE1a sends a RTSP_PAUSE to the cache server 3 (216, 217), and then sends a RTSP_TEARDOWN (218, 219).

Returning to FIG. 22, the cache server 3, when it receives the RTSP_PAUSE (558, 216), checks whether the playback time is being counted (559), and if it is not being counted (566), it waits to receive a message (554). Next, when it receives the RTSP TEARDOWN (563), it stops distribution of the content, and sends the count time to the cache control server 8 (561, 220).

When the cache control server 8 receives the normal speed playback time from the cache server 3, it sends an ACK, and determines the user's resume intention based on the resume intention criteria 430. Next, the cache control server 8 sets the delete inhibit span 404 (223). Next, the cache control server 8 sends a delete inhibit span notification to the cache server 3, the procedure (steps 150 and 153) whereby the cache server 3 performs a delete priority setting being the same as that of the first embodiment.

According to the second embodiment of the invention, the cache server 3 measures the normal speed playback time, and sends the measurement result to the cache control server 8, so the cache control server 8 can determine the user's resume intention based on the normal speed playback time. As a result, the cache control server 8 sets the delete inhibit span of the cache content based on whether the user has a resume intention, and can notify the cache server 3 thereof. The delete inhibit span may be set so that the delete inhibit span becomes longer as the measured normal speed playback time becomes longer, for example. Also, it may be determined that if the normal speed playback time is within the range set by the resume intention criteria 430, the user has no resume intention.

As described above, since the cache delete priority was set based on the normal speed playback time, as in the first embodiment, in a system that provides a streaming VOD service, the traffic of the core network N1 accompanying re-cache can be reduced, the load of the original content server 9 can be reduced, and the waiting time when the user does resume playback can be reduced.

In the second embodiment, the cache server 3 was provided with a normal speed playback time measurement routine 69, the normal speed playback time was measured and the measurement result was sent to the cache control server 8, but alternatively the SIP_URI of the cache control server 8 can be preset in the user terminal UE1a, the normal speed playback time measured by the user terminal UE1, and the measurement result sent from the user terminal UE1a to the cache control server 8.

In the above embodiments, an example was described where the portal server 10 in the VOD_ISP network N2 accepted a viewing request from the user terminal UE1, and a caching request was sent to the cache control server 8 via the user information server 11 and terminal location DB5, but the portal server 10, user information server 11, and terminal location DB5 may be integrated in one server. In this case, the integrated server can accept the viewing request from the user terminal UE1, perform authentication of the user terminal UE1, determine the edge node 2 to which the user terminal UE1 should connect, and send the determined content and information on the user terminal UE1 to the cache control server 8. Alternatively, the stop position of the content viewed by the user terminal UE1 can be saved by the integrated server. Alternatively, the original content server 3, portal server 10, user information server 11, and terminal location DB5 may be integrated in one server. In addition, the server in the VOD_ISP network N2 is not limited to the above, but can be implemented by a site (content distribution site that performs management of user information, distribution of content, and management of the location of the user terminal UE1).

What is claimed is:

1. A content delivery system comprising:
    a content distribution site that distributes a playback request from a user terminal, a cache server connecting the content distribution site and a user terminal, and temporarily storing the content distributed from the content distribution site, and a cache control server that manages the content held by the cache server,
    wherein the cache control server includes:
        a cache control unit that determines a possibility of resuming playback of the content after stopping the content based on a playback status of the content of the user terminal, and sets a delete inhibit span of the content stored in the cache server according to a result of the determining the possibility of resuming playback of the content after stopping the content, the cache control unit having a delete inhibit span setting unit that sets the delete inhibit span based on the stop position;
        a delete inhibit span notification unit that notifies the content delete inhibit span of the cache server and;
        a message processor that acquires a position at which the user terminal stopped during playback of the content as a playback status; and
    wherein the cache server includes:

a storage device that temporarily stores the content distributed by the content distribution site to the cache server;

a content providing unit that sends the content stored in the storage device to the user terminal;

a delete priority management unit that sets a delete priority for the content stored in the storage device based on the delete inhibit span received from the cache control server; and a content management unit that deletes content based on previously set delete priorities set by the delete priority management unit, when new content is stored from the content distribution site and there is no vacant area in the storage device of the cache server.

2. The content delivery system according to claim 1, wherein the cache control server has a preset range of stop positions for each content, wherein the cache control unit has an evaluation unit that, when the stop position is within the range of stop positions, determines not to play back after stopping the content, and wherein the delete inhibit span setting unit, when the evaluation unit determines not to play back after stopping the content, sets the delete inhibit span of the content to "delete allowed".

3. The content delivery system according to claim 1, wherein the cache server includes a playback time measurement unit that measures the time during which the user terminal played back the content at a preset speed as the playback status, and sends the measured playback time to the cache control server, wherein the cache control server includes a message processor that acquires the content playback time, and wherein the cache control unit sets the delete inhibit span of the content based on the playback time at the predetermined speed.

4. The content delivery system according to claim 3, wherein the cache control server holds the preset range of the playback time for each content, wherein the cache control unit includes an evaluation unit that determines not to play back after stopping the content concerned when the playback time is within the aforesaid playback time range, and wherein the delete inhibit span setting unit sets the delete inhibit span of the content to delete allowed when the evaluation unit determines not to play back after stopping the content.

5. The content delivery system according to claim 1, wherein the content delivery system includes plural cache servers, and wherein the cache control unit of the cache control server stores the delete inhibit span corresponding to the stored content for each cache server.

6. The content delivery system according to claim 1, wherein the content distribution site includes:

a portal server that accepts a request from a user terminal, and sends it to a user information server;

a user information server that receives the request from the portal server, authenticates the user terminal, notifies the request to the cache control server, and holds the stop position concerned when the request is a playback stop; and a content server that sends content to the cache server, wherein the cache control server notifies reading of the content corresponding to a playback request that has been successfully authenticated by the user information server, to the cache server; and wherein the cache server distributes the content read from the content server to the user terminal based on the notification.

\* \* \* \* \*